United States Patent
Pham et al.

(10) Patent No.: US 12,286,115 B2
(45) Date of Patent: Apr. 29, 2025

(54) THREE-DIMENSIONAL INTERSECTION STRUCTURE PREDICTION FOR AUTONOMOUS DRIVING APPLICATIONS

(71) Applicant: NVIDIA Corporation, Santa Clara, CA (US)

(72) Inventors: Trung Pham, Santa Clara, CA (US); Berta Rodriguez Hervas, San Francisco, CA (US); Minwoo Park, Saratoga, CA (US); David Nister, Bellevue, WA (US); Neda Cvijetic, East Palo Alto, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1054 days.

(21) Appl. No.: 17/116,138

(22) Filed: Dec. 9, 2020

(65) Prior Publication Data

US 2021/0201145 A1 Jul. 1, 2021

Related U.S. Application Data

(60) Provisional application No. 62/956,025, filed on Dec. 31, 2019.

(51) Int. Cl.
*B60W 30/18* (2012.01)
*G06N 3/04* (2023.01)
(Continued)

(52) U.S. Cl.
CPC ......... *B60W 30/18154* (2013.01); *G06N 3/04* (2013.01); *G06N 3/08* (2013.01);
(Continued)

(58) Field of Classification Search
CPC ....... B60W 30/18154; B60W 2520/06; B60W 2552/53; B60W 60/001; G06N 3/04;
(Continued)

(56) References Cited

U.S. PATENT DOCUMENTS 10,706,576 B2 * 7/2020 Ondruska .............. G06V 20/10
10,885,698 B2 1/2021 Muthler et al.
(Continued)

FOREIGN PATENT DOCUMENTS

EP 3 441 909 A1 2/2019
JP 2016115334 A 6/2016
(Continued)

OTHER PUBLICATIONS

Marita, Tiberiu, et al. "Stop-line detection and localization method for intersection scenarios." 2011 IEEE 7th International Conference on Intelligent Computer Communication and Processing. IEEE, 2011. (Year: 2011).*
(Continued)

*Primary Examiner* — Michael W Ayers
*Assistant Examiner* — Nicholas S Wu
(74) *Attorney, Agent, or Firm* — Taylor English Duma L.L.P.

(57) ABSTRACT

In various examples, a three-dimensional (3D) intersection structure may be predicted using a deep neural network (DNN) based on processing two-dimensional (2D) input data. To train the DNN to accurately predict 3D intersection structures from 2D inputs, the DNN may be trained using a first loss function that compares 3D outputs of the DNN—after conversion to 2D space—to 2D ground truth data and a second loss function that analyzes the 3D predictions of the DNN in view of one or more geometric constraints—e.g., geometric knowledge of intersections may be used to penalize predictions of the DNN that do not align with known intersection and/or road structure geometries. As such, live perception of an autonomous or semi-autonomous vehicle may be used by the DNN to detect 3D locations of intersection structures from 2D inputs.

21 Claims, 16 Drawing Sheets

(51) Int. Cl.
| | |
|---|---|
| G06N 3/08 | (2023.01) |
| G06T 7/33 | (2017.01) |
| G06V 10/764 | (2022.01) |
| G06V 10/82 | (2022.01) |
| G06V 20/56 | (2022.01) |
| G06V 20/64 | (2022.01) |
| G06N 3/045 | (2023.01) |

(52) U.S. Cl.
CPC .............. *G06T 7/33* (2017.01); *G06V 10/764* (2022.01); *G06V 10/82* (2022.01); *G06V 20/56* (2022.01); *G06V 20/647* (2022.01); *B60W 2520/06* (2013.01); *G06T 2207/30252* (2013.01)

(58) Field of Classification Search
CPC . G06N 3/08; G06N 3/045; G06T 7/33; G06T 2207/30252; G06V 10/764; G06V 10/82; G06V 20/56; G06V 20/647
See application file for complete search history.

(56) References Cited

U.S. PATENT DOCUMENTS

| | | | |
|---|---|---|---|
| 10,914,605 B1* | 2/2021 | Chen ................... | G06F 18/2323 |
| 11,321,924 B2 | 5/2022 | Molyneaux et al. | |
| 12,026,827 B2* | 7/2024 | Yu .............................. | G06T 7/70 |
| 2012/0194516 A1 | 8/2012 | Newcombe et al. | |
| 2016/0098496 A1* | 4/2016 | Joshi ......................... | E01C 1/02 703/1 |
| 2016/0364907 A1 | 12/2016 | Schoenberg | |
| 2018/0164812 A1 | 6/2018 | Oh et al. | |
| 2018/0188060 A1 | 7/2018 | Wheeler et al. | |
| 2019/0061771 A1 | 2/2019 | Bier et al. | |
| 2019/0120640 A1 | 4/2019 | Ho et al. | |
| 2019/0146497 A1 | 5/2019 | Urtasun et al. | |
| 2019/0156128 A1 | 5/2019 | Zhang et al. | |
| 2019/0189001 A1 | 6/2019 | Smothers et al. | |
| 2019/0197774 A1 | 6/2019 | Molyneaux et al. | |
| 2019/0286153 A1 | 9/2019 | Rankawat et al. | |
| 2020/0051318 A1 | 2/2020 | Muthler et al. | |
| 2020/0117213 A1 | 4/2020 | Tian et al. | |
| 2020/0117898 A1 | 4/2020 | Tian et al. | |
| 2020/0293796 A1 | 9/2020 | Sajjadi Mohammadabadi et al. | |
| 2020/0341466 A1 | 10/2020 | Pham et al. | |
| 2020/0410254 A1 | 12/2020 | Pham et al. | |
| 2021/0150722 A1 | 5/2021 | Homayounfar et al. | |
| 2021/0182596 A1* | 6/2021 | Adams .................. | G06V 20/588 |
| 2021/0300379 A1 | 9/2021 | Hackeloeer et al. | |
| 2022/0132145 A1 | 4/2022 | Choi et al. | |

FOREIGN PATENT DOCUMENTS

| | | |
|---|---|---|
| JP | 2018136632 A | 8/2018 |
| WO | 2016/183074 A1 | 11/2016 |
| WO | 2020/185779 A1 | 9/2020 |
| WO | 2020/219303 A1 | 10/2020 |

OTHER PUBLICATIONS

Cui, Jingze, et al. "A road-aware neural network for multi-step vehicle trajectory prediction." Database Systems for Advanced Applications: 23rd International Conference, DASFAA 2018, Gold Coast, QLD, Australia, May 21-24, 2018, Proceedings, Part I 23. Springer International Publishing, 2018. (Year: 2018).*
Zhang, Jie, et al. "Geometric constrained joint lane segmentation and lane boundary detection." proceedings of the european conference on computer vision (ECCV). 2018. (Year: 2018).*
Weber, Michael, Michael Fürst, and J. Marius Zöllner. "Direct 3d detection of vehicles in monocular images with a cnn based 3d decoder." 2019 IEEE Intelligent Vehicles Symposium (IV). IEEE, 2019. (Year: 2019).*
Wang, Yijing, et al. "Trajectory planning and safety assessment of autonomous vehicles based on motion prediction and model predictive control." IEEE Transactions on Vehicular Technology 68.9 (2019): 8546-8556. (Year: 2019).*
El Madawi, Khaled, et al. "Rgb and lidar fusion based 3d semantic segmentation for autonomous driving." 2019 IEEE Intelligent Transportation Systems Conference (ITSC). IEEE, 2019. (Year: 2019).*
Nedevschi, Sergiu, et al. "Accurate ego-vehicle global localization at intersections through alignment of visual data with digital map." IEEE transactions on intelligent transportation systems 14.2 (2012): 673-687. (Year: 2012).*
Garnett, Noa, et al. "3D-LaneNet: End-to-End 3D Multiple Lane Detection." arXiv preprint arXiv:1811.10203 (2018). (Year: 2018).*
Chougule, Shriyash, et al. "An efficient encoder-decoder CNN architecture for reliable multilane detection in real time." 2018 IEEE Intelligent Vehicles Symposium (IV). IEEE, 2018. (Year: 2018).*
Soheilian, Bahman, Nicolas Paparoditis, and Bruno Vallet. "Detection and 3D reconstruction of traffic signs from multiple view color images." ISPRS journal of photogrammetry and remote sensing 77 (2013): 1-20. (Year: 2013).*
Geiger, Andreas, et al. "3d traffic scene understanding from movable platforms." IEEE transactions on pattern analysis and machine intelligence 36.5 (2013): 1012-1025. (Year: 2013).*
Li, Jun, et al. "Deep neural network for structural prediction and lane detection in traffic scene." IEEE transactions on neural networks and learning systems 28.3 (2016): 690-703. (Year: 2016).*
Baumann, Ulrich, et al. "Classifying road intersections using transfer-learning on a deep neural network." 2018 21st International Conference on Intelligent Transportation Systems (ITSC). IEEE, 2018. (Year: 2018).*
International Preliminary Report on Patentability for PCT Application No. PCT/US2020/063945, filed Dec. 9, 2020, mailed on Jul. 14, 2022, 9 pages.
Chen, J., et al., "FOAD: Fast Optimization-based Autonomous Driving Motion Planner", Annual American Control Conference (ACC). IEEE, pp. 4725-4732 (Jun. 27-29, 2018).
ISO 26262, "Road vehicle—Functional safety," International standard for functional safety of electronic system, Retrieved from Internet URL: https://en.wikipedia.org/wiki/ISO_26262, accessed on Sep. 13, 2021, 8 pages.
IEC 61508, "Functional Safety of Electrical/Electronic/Programmable Electronic Safety-related Systems," Retrieved from Internet URL: https://en.wikipedia.org/wiki/IEC_61508, accessed on Apr. 1, 2022, 7 pages.
Park, J. J., et al., "DeepSDF: Learning Continuous Signed Distance Functions for Shape Representation", Proceedings of the IEEE/CVF Conference on Computer Vision and Pattern Recognition, pp. 165-174 (2019).
Invitation to pay additional fees received for PCT Patent Application No. PCT/US2020/021894, mailed on Jun. 9, 2020, 9 pages.
Invitation to pay additional fees received for PCT Application No. PCT/US2020/028116, mailed on Jul. 21, 2020, 12 pages.
International Preliminary Report on Patentability received for PCT Application No. PCT/US2020/021894, mailed on Sep. 23, 2021, 11 pages.
International Preliminary Report on Patentability received for PCT Application No. PCT/US2020/028116, mailed on Nov. 4, 2021, 14 pages.
International Preliminary Report on Patentability received for PCT Application No. PCT/US2020/039430, mailed on Jan. 6, 2022, 12 pages.
Preinterview First Office Action dated Feb. 22, 2022 in U.S. Appl. No. 16/911,007, 2 pages.
Notice of Allowance dated May 11, 2022 in U.S. Appl. No. 16/911,007, 9 pages.
International Search Report and Written Opinion received for PCT Patent Application No. PCT/US2020/063945, mailed on Mar. 26, 2021, 12 pages.
"Taxonomy and Definitions for Terms Related to Driving Automation Systems for On-Road Motor Vehicles," Standard No. J3016-201806, published on Jun. 15, 2018, pp. 35.

(56) References Cited

OTHER PUBLICATIONS

"Taxonomy and Definitions for Terms Related to Driving Automation Systems for On-Road Motor Vehicles," Standard No. 13016-201609, published on Sep. 30, 2016, pp. 30.
U.S. Appl. No. 16/911,007, of Trung Pham, et al., filed Jun. 24, 2020, 89 pages.
International Search Report and Written Opinion received in PCT Application No. PCT/US2020/021894, mailed on Aug. 3, 2020, 14 pages.
International Search Report and Written Opinion received in PCT Application No. PCT/US2020/028116 mailed on Sep. 11, 2020, 18 pages.
International Search Report and Written Opinion received in PCT Application No. PCT/US2020/039430 mailed on Oct. 9, 2020, pp. 13.
Pham, Trung; First Office Action for Japanese Patent Application No. 2021-575363, filed Dec. 9, 2020, mailed Jun. 14, 2024, 9 pgs.
Madawi, et al.; "RGB and LiDAR fusion based 3D Semantic Segmentation for Autonomous Driving," arXiv:1906.00208v2; Jul. 17, 2019, 7 pgs.
Bhatt, et al.; "Have I reached the intersection: A deep learning-based approach for intersection detection from monocular cameras," IEEE/RSJ Int. Conf. on Intelligent Robots and Systems (IROS), 2017, 7 pgs.

\* cited by examiner

THREE-DIMENSIONAL INTERSECTION STRUCTURE PREDICTION FOR AUTONOMOUS DRIVING APPLICATIONS

CROSS-REFERENCE TO RELATED APPLICATIONS

This application claims the benefit of U.S. Provisional Application No. 62/956,025, filed on Dec. 31, 2019, which is hereby incorporated by reference in its entirety.

This application is related to U.S. Non-Provisional application Ser. No. 16/848,102, filed on Apr. 14, 2020, U.S. Non-Provisional application Ser. No. 16/911,007, filed Jun. 24, 2020, and U.S. Non-Provisional application Ser. No. 16/814,351, filed on Mar. 10, 2020, each of which is hereby incorporated by reference in its entirety.

BACKGROUND

Autonomous driving systems and advanced driver assistance systems (ADAS) may leverage sensors, such as cameras, to perform various tasks—such as lane keeping, lane changing, lane assignment, camera calibration, turning, path planning, and localization. For example, for autonomous and ADAS systems to operate independently and efficiently, an understanding of the surrounding environment of the vehicle in real-time or near real-time may be generated. This understanding may include information as to locations of objects, obstacles, lanes, and/or intersections in the environment with respect to various demarcations, such as lanes, road boundaries, intersection lines, and/or the like. The information of the surrounding environment may be used by a vehicle when making decisions, such as what path or trajectory to follow.

As an example, information regarding locations and layouts of intersections in an environment of an autonomous or semi-autonomous vehicle may prove valuable when making path planning, obstacle avoidance, and/or control decisions—such as where to stop, what path to use to safely traverse an intersection, where other vehicles or pedestrians may be located, and/or the like. This is particularly important when the vehicle is operating in urban and/or semi-urban driving environments, where intersection-scene understanding and path planning becomes crucial due to the increased number of variables relative to a highway driving environment. For example, where a vehicle is to perform a left turn through an intersection in a bi-directional, multi-lane driving environment, determining locations of and directionality with respect to other lanes, as well as determining locations of crosswalks or bike paths, become critical to safe and effective autonomous and/or semi-autonomous driving.

In conventional systems, intersections may be interpolated from pre-stored high-definition (HD), three-dimensional (3D) maps of a driving surface of the vehicle. For example, the structure and orientation of intersections and the surrounding area may be gleaned from the HD map. However, using an HD map for intersection identification and navigation requires that each intersection that may be encountered by the vehicle be previously identified and memorialized in the HD map—a time consuming, burdensome, and challenging task. For example, the map update process can be logistically more complex when manual-labelling larger geographic regions (e.g., cities, states, countries) is required in order for the vehicle to be able to independently and effectively drive in varying regions.

In other conventional systems, deep neural networks (DNNs) may be trained to predict intersection information in two-dimensional (2D) image space, and these predictions may be converted to 3D world-space coordinates. However, a 2D to 3D coordinate conversion is inherently inaccurate as a flat ground assumption is required. Many roads—especially in more urban environments—are not flat, and without accounting for the slope or grade of the driving surface, the 2D predictions may not map accurately to 3D world-space. To account for this, some DNNs are trained to predict intersection information in 3D world-space using 3D ground truth data. However, generating accurate and reliable 3D ground truth data (e.g., from LIDAR data) of a sufficient quantity to effectively train the DNN is expensive, and annotating LIDAR data to generate ground truth information is a challenging task. For example, identifying intersection lines, boundaries, and/or other information from LIDAR point clouds is unreliable, and requires extensive human labeling and annotation for each instance of training data. As a result, the end-to-end training process for these conventional DNNs may take a significant amount of time, and result in potentially inaccurate DNNs that take longer to optimize for deployment in a vehicle.

SUMMARY

Embodiments of the present disclosure relate to three-dimensional (3D) intersection structure prediction for autonomous driving applications. Systems and methods are disclosed that use deep neural networks (DNNs) to predict 3D intersection structures in world-space—e.g., locations of entry lines, exit lines, pedestrian crossings, bike lanes, etc.—from two-dimensional (2D) image data in image-space. As such, and in contrast to conventional approaches, the current systems and methods provide techniques for DNNs to use live perception capabilities of a sensor platform to detect 3D locations of intersection structures from 2D input data, and to leverage this information to generate paths to navigate intersections, e.g., for a vehicle or machine. This approach offers greater scalability for handling various types of intersections without the burden of manually labeling each intersection individually for HD map generation, the inaccuracies introduced by using the flat ground assumption to compute 3D intersection structure from 2D perception results, and the challenges of generating and accurately labeling LIDAR point clouds for 3D ground truth generation. In some embodiments, the live perception approaches may be performed in conjunction with map-based approaches—e.g., where high quality map data is available—to provide redundancy and further validate the results of the perception-based approach.

For example, to train the DNN to accurately predict 3D intersection structures from 2D images, the DNN may be trained using a first loss function corresponding to 2D ground truth data and a second loss function corresponding to 3D geometric consistency. The first loss function may compare 3D outputs of the DNN—after conversion to 2D image-space using intrinsic and/or extrinsic parameters of a sensor—to 2D ground truth data. The second loss function may analyze the 3D predictions of the DNN in view of one or more geometric constraints. For example, geometric knowledge of intersections may be used to penalize predictions of the DNN that do not align with known geometries. As such, where the 3D outputs of the DNN are not smooth—e.g., because quantum leaps are impossible in the physical 3D real-world—the outputs may be penalized. As another example, a straight line constraint may be imposed, such that predictions where intersection entry or exit lines are not straight—or within some threshold of being straight—are penalized. Further, a lane width constraint may be imposed, such that a range of known lane width possibilities is enforced on the outputs of the DNN in order to penalize predictions that are outside of some threshold range of lane widths. As such, once trained and deployed in a vehicle, the DNN may accurately predict 3D intersection structures from 2D sensor data.

BRIEF DESCRIPTION OF THE DRAWINGS

The present systems and methods for three-dimensional (3D) intersection structure prediction for autonomous driving applications are described in detail below with reference to the attached drawing figures, wherein.

DETAILED DESCRIPTION

Figure 1:
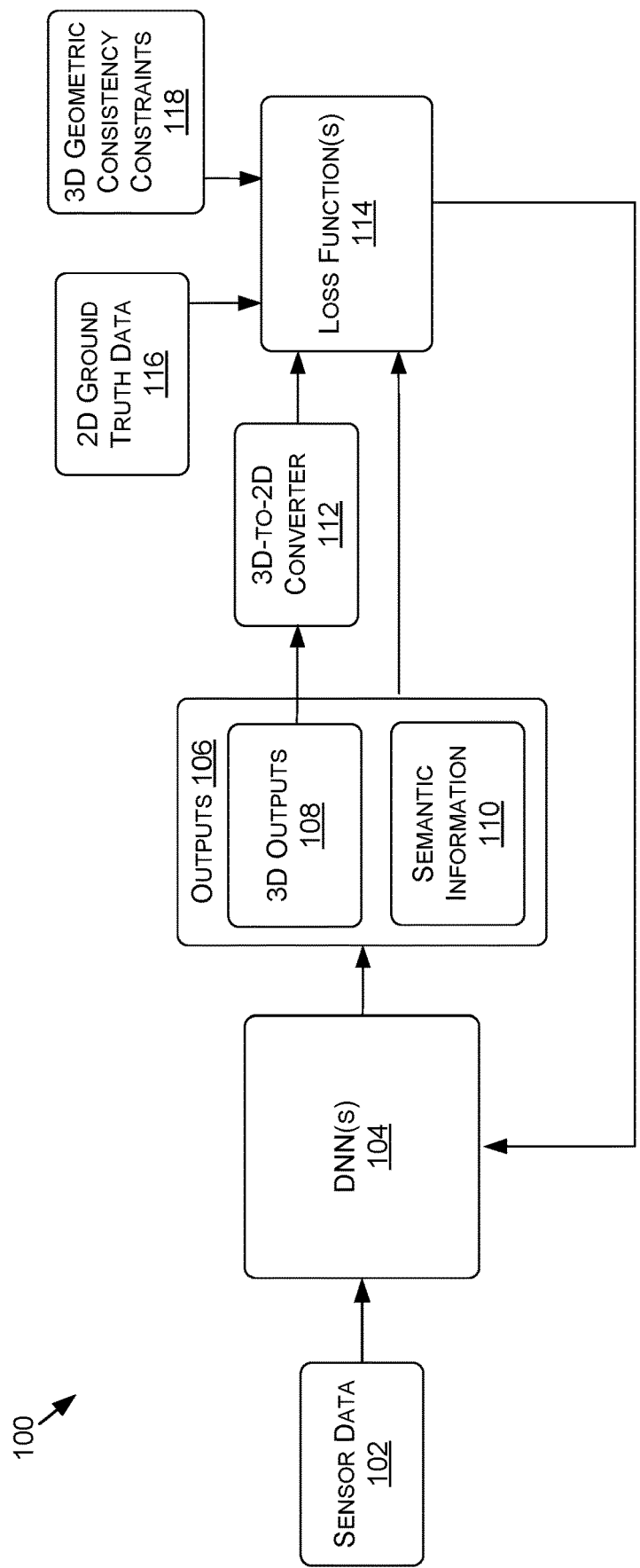
FIG. 1 is an example data flow diagram illustrating an example process for training a neural network to detect intersections, in accordance with some embodiments of the present disclosure.

Systems and methods are disclosed related to three-dimensional (3D) intersection structure prediction for autonomous driving applications. Although the present disclosure may be described with respect to an example autonomous vehicle 800 (alternatively referred to herein as "vehicle 800" or "ego-vehicle 800," an example of which is described with respect to FIGS. 8A-8D), this is not intended to be limiting. For example, the systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, flying vessels, boats, shuttles, emergency response vehicles, motorcycles, electric or motorized bicycles, aircraft, construction vehicles, underwater craft, drones, and/or other vehicle types. In addition, although the present disclosure may be described with intersection structure for vehicle applications, this is not intended to be limiting, and the systems and methods described herein may be used in augmented reality, virtual reality, robotics, security and surveillance, autonomous or semi-autonomous machine applications, and/or any other technology spaces where detection of intersection or other environment structures and/or poses may be used.

In deployment, sensor data (e.g., 2D images, videos, etc.) may be received and/or generated using sensors (e.g., cameras, RADAR sensors, LIDAR sensors, etc.) located or otherwise disposed on an autonomous or semi-autonomous vehicle. The sensor data may be applied to a neural network (e.g., a deep neural network (DNN), such as a convolutional neural network (CNN)) that is trained to identify areas of interests pertaining to road markings, road boundaries, intersections, and/or the like (e.g., raised pavement markers, rumble strips, colored lane dividers, sidewalks, cross-walks, turn-offs, etc.) represented by the sensor data, as well as semantic and/or directional information pertaining thereto. More specifically, the DNN may be trained to compute a 3D intersection pose from two-dimensional (2D) input data (e.g., images, range images, or other 2D sensor data representations), including one or more of key points corresponding to line segments defining the 3D intersection pose, and to generate outputs identifying semantic information corresponding to the key points and/or line segments generated therefrom (e.g., crosswalk, crosswalk entry, crosswalk exit, intersection entry, intersection exit, etc., or a combination thereof), and/or other information. In some examples, the computed key points may be 3D world-space locations where center and/or end points of intersection features or line segments are located, such as pedestrian crossing (e.g., crosswalks) entry lines, intersection entrance lines, intersection exit lines, stop lines, bike lanes, and/or pedestrian crossing exit lines. As such, a 3D structure and pose of the intersection may be determined using the key points, line segments, and/or related (e.g., semantic) information, where the 3D structure may include representations for lanes, lane types, key points, line segments, crosswalks, directionality, heading, and/or other information corresponding to the intersection.

During training, the DNN may be trained with 2D images or other sensor data representations labeled or annotated with line segments representing lanes, crosswalks, entry-lines, exit-lines, bike lanes, intersection areas, etc., and may further include semantic information corresponding thereto. In some examples, key points may be labeled to include corner or end points of the lanes (e.g., line segments representing lane segments of intersection structures), which may be inferred from the center points, and/or width information. As a result, the intersection structure may be encoded using these key points and/or line segments with limited labeling required, as the information may be determined using the line segment annotations and semantic information. In some examples, the 2D intersection structure ground truth may be defined by a set of polygons corresponding to potential areas of interest in an intersection and semantic information corresponding thereto (e.g., inside the intersection, outside the intersection, etc.). The labeled line segments and semantic information may then be used for comparison—e.g., using a loss function—to computed outputs of the DNN (e.g., after conversion from 3D world-space to 2D image-space).

In order to train the DNN to predict 3D intersection structure from a 2D input image, the 3D intersection structure predictions of the DNN may be projected—e.g., using intrinsic and/or extrinsic parameters of a sensor(s) that generated the 2D image—into 2D image-space. A loss function may then be used to measure a distance between the pixels of the 2D intersection ground truth data and the 2D projection of the 3D prediction. The loss function may be used to minimize the distance to improve the accuracy or precision of the DNN. As such, the DNN may be trained to learn a mapping between 2D images and 3D intersection structure in world-space.

Further, one or more 3D geometric consistency constraints may be applied—e.g., via a loss function—to the 3D predictions of the DNN to train the DNN to more accurately predict 3D intersection structures in view of geometric constraints. Knowledge about real-world intersections and their designs may be used to determine the 3D geometric consistency constraints. For example, a smoothness constraint, straight line constraint, and/or statistical variability of lane widths may be used as geometric constraints for evaluating the outputs of the DNN. Outputs that do not align with these constraints may be penalized using a loss function corresponding to the 3D geometric consistency constraints. A total loss may then include the 3D geometric consistency loss and 2D ground truth loss. The DNN may be trained to minimize the total loss in order to accurately and efficiently predict 3D intersection structure based on a 2D image input.

Once the DNN is trained, the DNN may predict outputs in 3D world-space corresponding to line segments, key points, intersection areas, 3D intersection structure, and/or other outputs corresponding to the 2D input data. In some embodiments, a 3D location for the key points may be determined as one or more end points of each line segment, a center point of a predicted line segment, or a combination thereof. These 3D locations of key points may then be used—e.g., by a post-processor—to construct the 3D intersection structure for use by the vehicle in navigating or traversing the intersection.

In some embodiments, once the 3D locations of the key points are determined, any number of additional post-processing operations may be performed in order to ultimately "connect the dots (or key points)" and generate paths for navigating an intersection. For example, the key points may be connected to generate polylines that represent potential paths for traversing the intersection. The final paths may be assigned path types, which may be determined relative to the position of the vehicle, the location of the key points, and/or the like. Potential non-limiting path types include: left turn, right turn, switch lanes, and/or continue in lane. Curve fitting may also be implemented in order to determine final shapes that most accurately reflect a natural driving curve of the potential paths. Curve fitting may be performed using polyline fitting, polynomial fitting, clothoid fitting, and/or other types of curve-fitting algorithms. The shape of the potential paths may be determined based on the locations, heading vectors (e.g., angles), semantic information, and/or other information associated with the key points to be connected. The curve fitting process may be repeated for all key points that may potentially be connected to each other to generate all possible paths the vehicle can take to navigate the intersection. In some examples, non-feasible paths may be removed from consideration based on traffic rules and physical restrictions associated with such paths.

In some embodiments, a matching algorithm may be used to connect the key points and generate potential paths for the vehicle to navigate the intersection. In such examples, matching scores may be determined for each pair of key points based on the location of the key points, heading vectors, semantic information, and/or the shape of the fitted curve between the pair of key points. In some examples, a linear matching algorithm such as Hungarian matching algorithm may be used. In other examples, a non-linear matching algorithm such as spectral matching algorithm may be used to connect a pair of key points.

In either example, once the paths through the intersection are determined, this information may be used to perform one or more operations by the vehicle. For example, a world model manager may update the world model for aid in navigating the intersection, a path planning layer of an autonomous driving software stack may use the intersection information to determine the path through the intersection (e.g., along one of the determined potential paths), and/or a control component may determine controls of the vehicle for navigating the intersection according to a determined path.

Training a DNN to Compute 3D Intersection Structures

With reference to FIG. 1, FIG. 1 is an example data flow diagram illustrating an example process 100 for training a deep neural network (DNN) 104 to detect intersections, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the training of the neural network according to the process 100 may be implemented, at least in part, using similar components, features, and/or functionality as described herein with respect to example computing device 900 of FIG. 9 and/or example data center 1000 of FIG. 10.

The process 100 may include generating and/or receiving sensor data 102 from one or more sensors. The sensor data 102 may be received, as a non-limiting example, from one or more sensors of a vehicle (e.g., vehicle 800 of FIGS. 8A-8C as described herein). The sensor data 102 may be used by the vehicle, and within the process 100, to train one or more DNN(s) 104 to detect intersections in 3D from at least partially 2D input data (e.g., camera images). During training, the sensor data 102 may be generated using one or more data collection vehicles that generate sensor data for training DNNs, such as the DNN(s) 104, and/or may be pre-generated and included in a training data set. The sensor data 102 used during training may additionally or alternatively be generated using simulated sensor data (e.g., sensor data generated using one or more virtual sensors of a virtual vehicle in a virtual environment). Once trained and deployed in the vehicle 800, the sensor data 102 may be generated by one or more sensors of the vehicle 800 and processed by the DNN(s) 104 to compute 3D intersection structures, semantic information, and/or directional information corresponding to intersections.

Figure 8A:
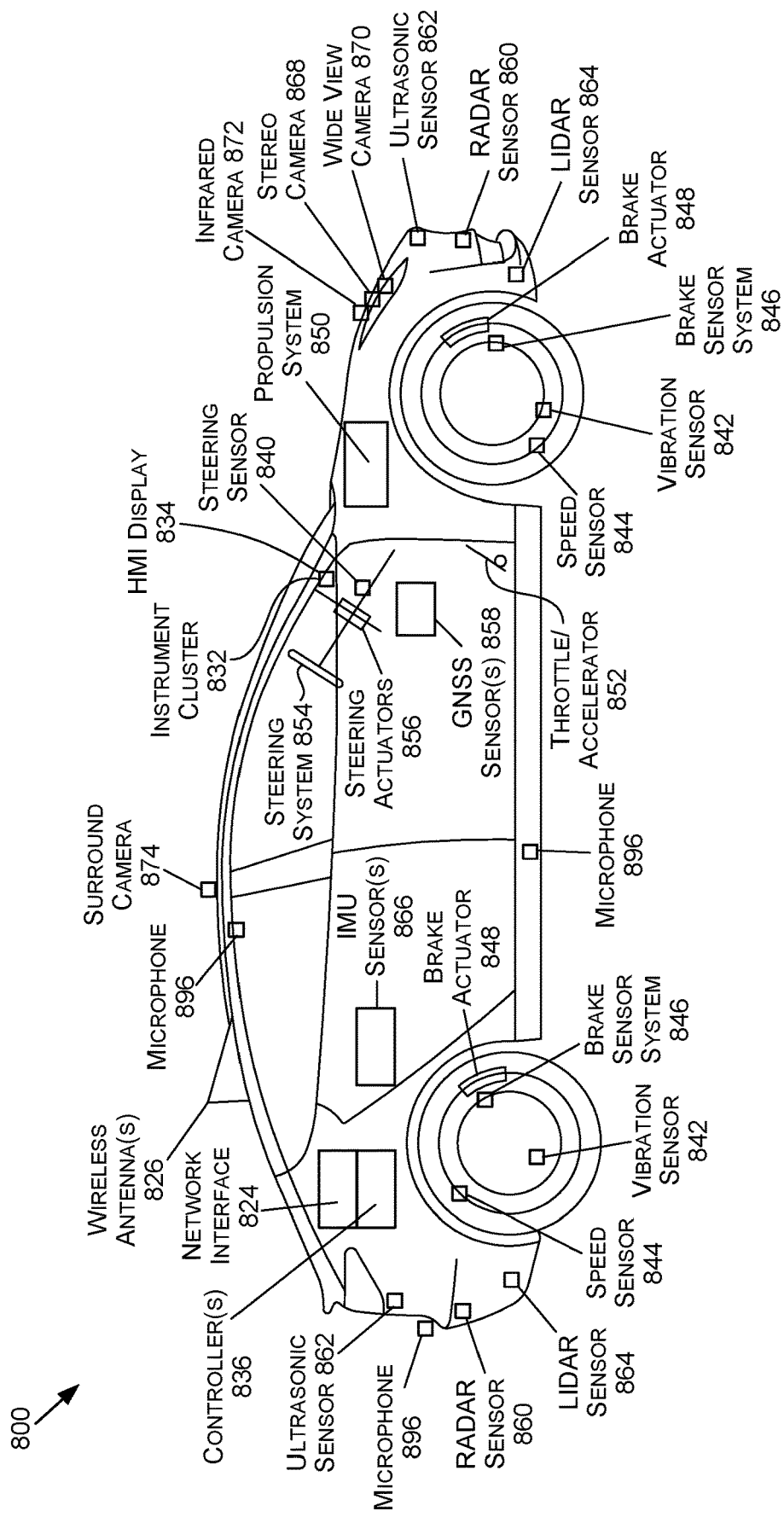
FIG. 8A is an illustration of an example autonomous vehicle, in accordance with some embodiments of the present disclosure.
Figure 8B:
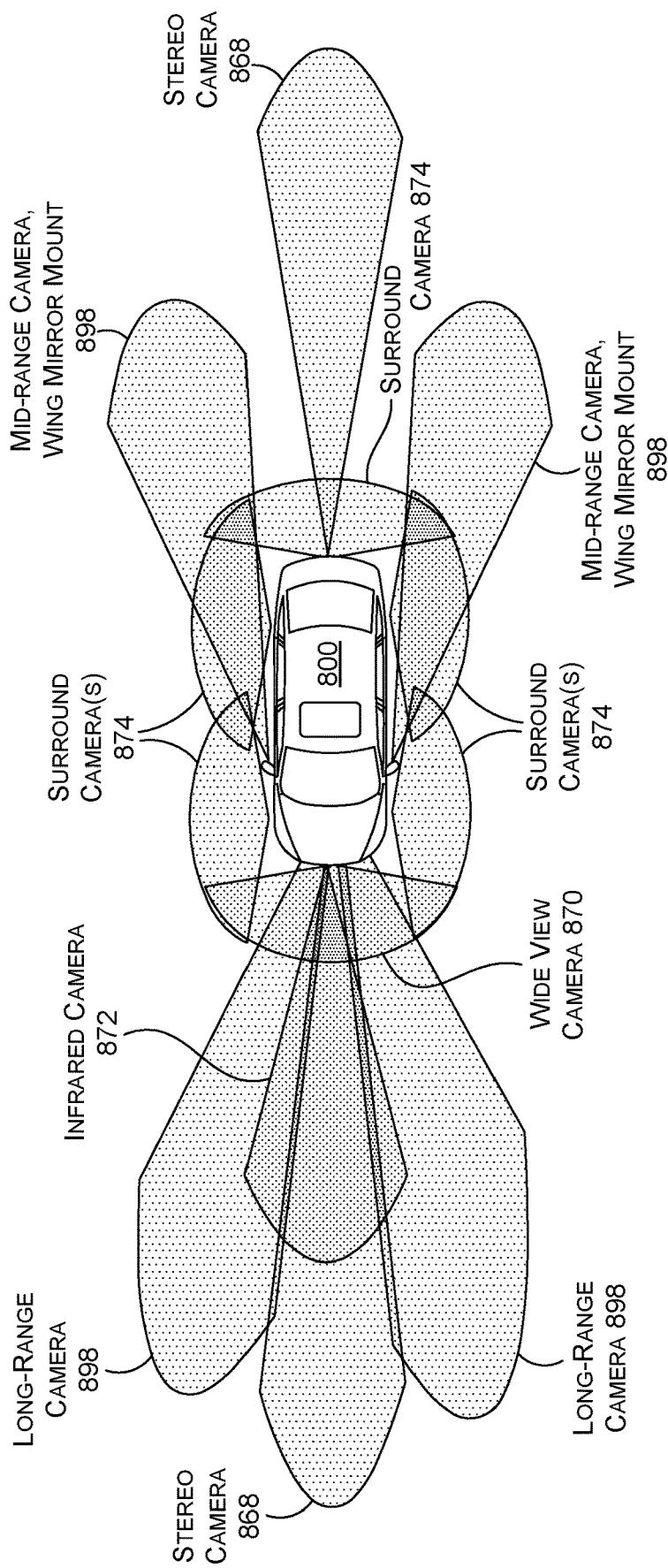
FIG. 8B is an example of camera locations and fields of view for the example autonomous vehicle of FIG. 8A, in accordance with some embodiments of the present disclosure.
Figure 8C:
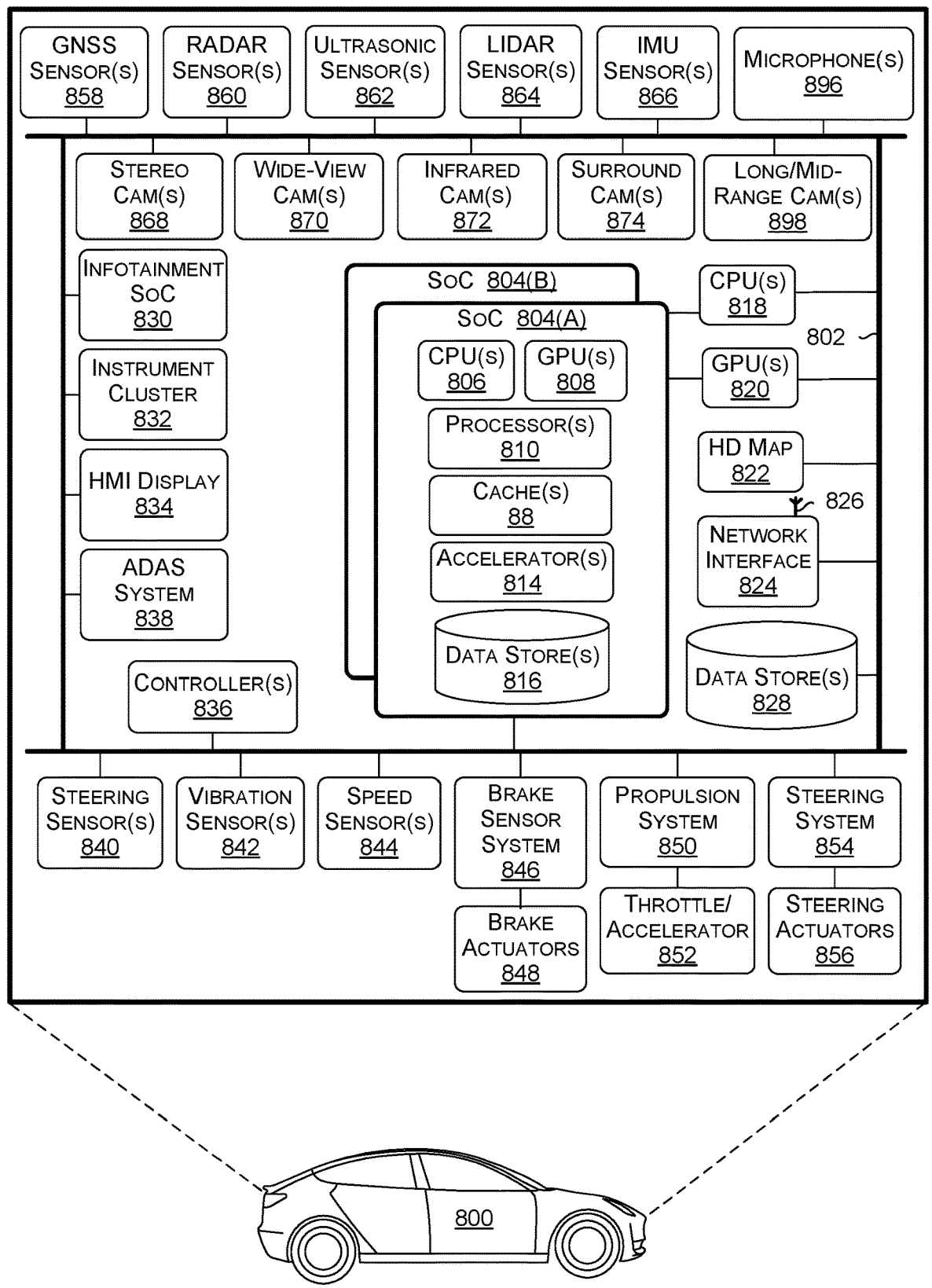
FIG. 8C is a block diagram of an example system architecture for the example autonomous vehicle of FIG. 8A, in accordance with some embodiments of the present disclosure.

As such, the sensor data 102 may include, without limitation, sensor data 102 from any of the sensors of the vehicle including, for example and with reference to FIGS. 8A-8C, RADAR sensor(s) 860, ultrasonic sensor(s) 862, LIDAR sensor(s) 864, stereo camera(s) 868, wide-view camera(s) 870 (e.g., fisheye cameras), infrared camera(s) 872, surround camera(s) 874 (e.g., 360 degree cameras), long-range and/or mid-range camera(s) 878, and/or other sensor types. As another example, the sensor data 102 may include virtual (e.g., simulated or augmented) sensor data generated from any number of sensors of a virtual vehicle or other virtual object in a virtual (e.g., testing) environment. In such an example, the virtual sensors may correspond to a virtual vehicle or other virtual object in a simulated environment (e.g., used for testing, training, and/or validating neural network performance), and the virtual sensor data may represent sensor data captured by the virtual sensors within the simulated or virtual environment. As such, by using the virtual sensor data, the DNN(s) 104 described herein may be tested, trained, and/or validated using simulated or augmented data in a simulated environment, which may allow for testing more extreme scenarios outside of a real-world environment where such tests may be less safe.

In some embodiments, the sensor data 102 may include image data representing an image(s), image data representing a video (e.g., snapshots of video), and/or sensor data representing representations of sensory fields of sensors (e.g., depth maps for LIDAR sensors, a value graph for ultrasonic sensors, etc.). Where the sensor data 102 includes image data, any type of image data format may be used, such as, for example and without limitation, compressed images such as in Joint Photographic Experts Group (JPEG) or Luminance/Chrominance (YUV) formats, compressed images as frames stemming from a compressed video format such as H.264/Advanced Video Coding (AVC) or H.265/High Efficiency Video Coding (HEVC), raw images such as originating from Red Clear Blue (RCCB), Red Clear (RCCC), or other type of imaging sensor, and/or other formats. In addition, in some examples, the sensor data 102 may be used within the process 100 without any pre-processing (e.g., in a raw or captured format), while in other examples, the sensor data 102 may undergo pre-processing (e.g., noise balancing, demosaicing, scaling, cropping, augmentation, white balancing, tone curve adjustment, etc., such as using a sensor data pre-processor (not shown)). As used herein, the sensor data 102 may reference unprocessed sensor data, pre-processed sensor data, or a combination thereof.

The sensor data 102 used for training may include original images (e.g., as captured by one or more image sensors), down-sampled images, up-sampled images, cropped or region of interest (ROI) images, otherwise augmented images, and/or a combination thereof. The DNN(s) 104 may be trained using the images (and/or other sensor data 102) as well as corresponding ground truth data—e.g., 2D ground truth data 116. The ground truth data may include annotations, labels, masks, and/or the like. For example, in some embodiments, the 2D ground truth data may correspond to annotations of intersection areas or line segments, classifications of the intersection area or line segments, and/or directional information associated therewith—e.g., as described with respect to FIGS. 2A-2B and 3A-3B. In some embodiments, the 2D ground truth data 116 may be similar to the ground truth data described in U.S. Non-Provisional application Ser. No. 16/848,102, filed on Apr. 14, 2020, U.S. Non-Provisional application Ser. No. 16/911,007, filed Jun. 24, 2020, and/or U.S. Non-Provisional application Ser. No. 16/814,351, filed on Mar. 10, 2020, each of which is hereby incorporated by reference in its entirety.

Where annotations are used to generate the 2D ground truth data 116, the annotations may be generated within a drawing program (e.g., an annotation program), a computer aided design (CAD) program, a labeling program, another type of program suitable for generating the annotations, and/or may be hand drawn, in some examples. In any example, the 2D ground truth data 116 may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines the location of the labels), and/or a combination thereof (e.g., human identifies center or origin point and dimensions of areas, machine generates polygons and/or labels for intersection areas).

The intersection area may include annotations, or other label types, corresponding to bounding shapes—e.g., polygons—delineating areas of interest of intersections. In some examples, an intersection area may be delineated—e.g., within the sensor data representations of the sensor data 102—by one or more polygons corresponding to pedestrian crossing areas, intersection entry areas, intersection exit areas, unclear areas, no lane areas, intersection interior areas, partially visible areas, fully visible areas, etc., in the sensor data 102. The polygons may be generated as bounding boxes. Semantic information (e.g., classifications) corresponding to the 2D ground truth data 116 may be generated for each of the images (or other sensor data representation types) and/or for each one or more of the polygons in the images represented by the sensor data 102 used for training the DNN(s) 104. The number of classifications may correspond to the number and/or types of features that the DNN(s) 104 is trained to predict, or to the number of intersection areas and/or types of features in the respective image.

Depending on the embodiment, the semantic information may correspond to classifications or tags corresponding to the feature type or intersection area class, such as but not limited to pedestrian crossing areas, intersection entry areas, intersection exit areas, unclear areas, no lane areas, intersection interior areas, partially visible areas, fully visible areas, and/or the like. In some examples, the classification(s) may initially correspond to intersection interior areas and/or intersection exterior areas. An intersection interior area classification may refer to an intersection area that includes an area inside the intersection where paths of vehicles traversing the intersection in various directions may cross.

An intersection exterior area classification may refer to an intersection area that includes areas outside of the intersection interior area.

The intersection areas classified as intersection exterior areas may each further be labeled with classifications corresponding to attributes corresponding to the feature type of intersection exit areas, including, for example and without limitation: pedestrian crossing areas, intersection entry areas, intersection exit areas, unclear areas, no lane areas, and/or the like. Specifically, an intersection entry attribute may correspond to an intersection area where one or more vehicles are about to enter the corresponding intersection from various different directions. An intersection exit area may correspond to an intersection area where one or more vehicle(s) that recently exited the intersection in various directions may be located. It should be understood that information regarding intersection exit areas may be particularly important as the vehicle 800 must safely traverse the intersection exit area in order to safely traverse the intersection. Similarly, a pedestrian crossing area may refer to an intersection area that corresponds to pedestrian crossings located outside the intersection interior area. An area classified as a "No lane area" may correspond to an intersection area where vehicles are not allowed to traverse, for example, bike lanes, pedestrian walkways, and/or the like. An "Unclear area" attribute may correspond to an intersection area where the travel direction for vehicles is unclear. In addition, the classifications for the intersection interior area and intersection exterior area classes may also include one of fully visible area and/or partially visible area attribute. In examples, where the classification includes a fully visible area attribute or class label, the corresponding intersection area may include a fully visible surface, for example, without any obstructions. In contrast, where the classification includes a partially visible area attribute or class label, the corresponding intersection area may include obstruction(s), such as occlusion(s) such that the driving surface in the area is only partially visible in the corresponding sensor data 102. The labeling ontologies described herein are for example purposes only, and additional and/or alternative class labels may be used without departing from the scope of the present disclosure.

Figure 2A:
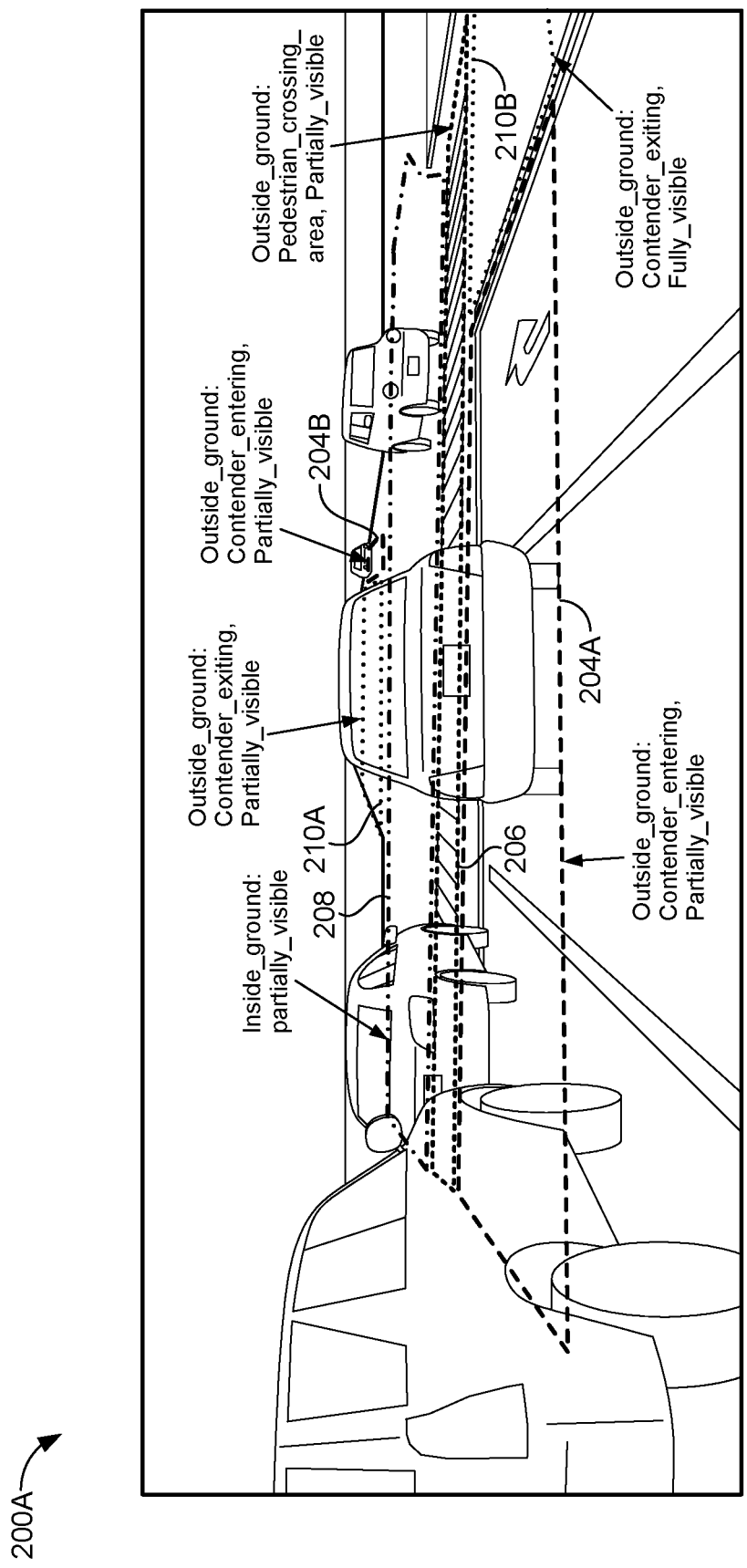
FIGS. 2A-2B are illustrations of example annotations for generating ground truth data for training a neural network to detect intersections, in accordance with some embodiments of the present disclosure.
Figure 2B:
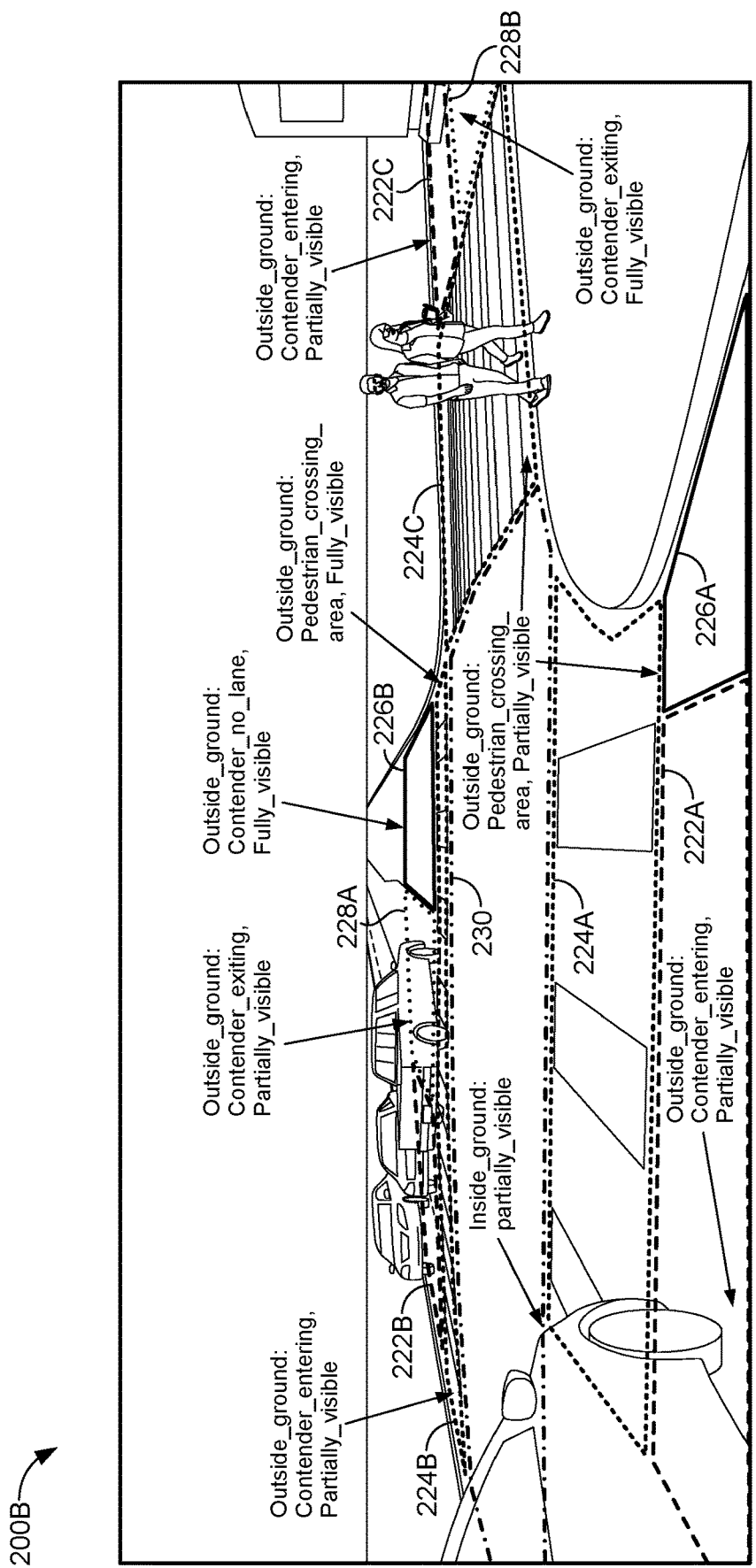

As non-limiting examples, and with respect to FIGS. 2A-2B, FIGS. 2A-2B illustrate example annotations corresponding to sensor data 102 for use in ground truth generation for training a DNN to detect intersections, in accordance with some embodiments of the present disclosure. For example, FIG. 2A illustrates an example labeling (e.g., corresponding to the semantic information) of an image 200A that may be used to generate ground truth data in accordance with the training process 100 of FIG. 1. Intersection areas or regions in an image may be annotated by intersection areas (e.g., areas 204A, 204B, 206, 208, 210A, and 210B) and corresponding classifications (e.g., "intersection interior," "partially visible," "vehicle exit," "vehicle entry," "partially visible," "pedestrian crossing," etc.). For example, intersection area 204A may be labeled using a polygon and classified as having one or more attributes such as "intersection entry" and "partially visible." Similarly, intersection areas 204B, 206, 208, 210A, and 210B may be labeled using polygons, where intersection 204B may be classified as having one or more attributes such as "vehicle entry" and "partially visible," intersection area 206 may be classified as having one or more attributes such as "pedestrian crossing" and "partially visible," intersection area 208 may be classified as having one or more attributes such as "intersection interior" and "partially visible," intersection area 210A may be classified as having one or more attributes such as "vehicle exit" and "partially visible," and intersection area 210B may be classified as having one or more attributes such as "vehicle exit" and "fully visible." In some examples, each intersection area belonging to a common class or classification may also be annotated with a polygon of a matching color (or some other visual indication of semantic information). For example, the polygons for intersection areas 204A and 204B may be of the same color and/or style as they are both classified as vehicle entry classification. Similarly, the polygons for intersection areas 210A and 210B may be annotated using the same color and/or style as they are both classified as vehicle exit classification. These labeling or annotation styles may be known to the system 100 as corresponding to particular classes, and this information may be used to generate the encoded ground truth data for training the DNN(s) 104.

Referring now to FIG. 2B, FIG. 2B illustrates another example of annotations applied to sensor data to train a DNN(s) 104 to detect intersection areas, in accordance with some embodiments of the present invention. As depicted here, intersection areas 222A-222C, 224A-224C, 226A-226B, 228A-228B, and 230 may be annotated with polygons and corresponding classifications (e.g., "intersection interior," "partially visible," "vehicle exit," "vehicle entry," "partially visible," "pedestrian crossing," etc.). For example, intersection areas 222A, 222B, and 222C may be labeled using a similar color and/or style polygon and classified as one or more of "vehicle entry" and "partially visible." Similarly, intersection areas 224A, 224B, and 224C may be labeled using a similar color and/or style polygon and classified as one or more of "pedestrian crossing," "fully visible," and "partially visible." Intersection areas 226A and 226B may be labeled using a similar color and/or style polygon and classified as one or more of "no lane," "fully visible," and "partially visible." Intersection areas 228A and 228B may be labeled using a similar color and/or style polygon and classified as one or more of "vehicle exit," "fully visible," and "partially visible." Intersection area 230 may be labeled using a polygon and classified as one or more of "intersection interior" and "partially visible."

The annotations may be of similar visual representation for a same classification. As illustrated, intersection area 222A, 222B, and 222C may be classified as vehicle exit areas. In this way, similarly classified features of the image may be annotated in a similar manner. Further, it should be noted that classifications may be compound nouns. The different classification labels may be represented in FIG. 2B by solid lines, dashed lines, etc., to represent different classifications. Further, the different classification labels may be nouns and/or compound nouns. This is not intended to be limiting, and any naming convention for classifications may be used to illustrate differences in classification labels for features (e.g., intersection areas) in the images.

As additional or alternative options for 2D ground truth data 116 generation, lane (or line) labels may be generated in association with the sensor data 102. For example, annotations, or other label types, corresponding to features or areas of interest corresponding to the intersection may be generated. In some examples, an intersection structure may be defined as a set of line segments corresponding to lanes, crosswalks, entry-lines, exit-lines, bike lanes, etc., in the sensor data 102. The line segments may be generated as polylines, with a center of each polyline defined as the center for the corresponding line segment. Semantic information (e.g., classifications) may be generated for each of the images (and/or other sensor data representations) and/or for each one or more of the line segments and centers in the images represented by the sensor data 102 used for training the DNN(s) 104. The number of classifications, similar to described above, may correspond to the number and/or types of features that the DNN(s) 104 is trained to predict, or to the number of lanes and/or types of features in the respective image. Depending on the embodiment, the classifications may correspond to classifications or tags corresponding to the feature type, such as but not limited to, crosswalk, crosswalk entry, crosswalk exit, intersection entry, intersection exit, and/or bike lane.

In some examples, the intersection structure may be determined based on the annotations. In such examples, a set of key points may be determined from lane labels, with each key point corresponding to a center (or left edge, or right edge, etc.) of a corresponding line segment extending across a lane. Although key points are described primarily with respect to center points of lanes segments, this is not intended to be limiting, and in some examples corner or end-points of each lane may also be determined as key points for respective instances of the sensor data 102. For example, corner or end-points of each the lanes may be inferred from center key points and the directionality of the lane, or from the lane labels or annotations themselves. In addition, a number of lanes or line segments as well as a heading, directionality, width, and/or other geometry corresponding to each line segment from each lane may be determined from the annotations—e.g., from the lane label and the classifications. As a result, even though the annotations may not directly indicate certain intersection structure or pose information—such as heading direction, lane width, and/or directionality of the lane—the annotations may be analyzed or processed to determine this information.

For example, where a first lane label extends along the width of the lane and includes a classification of "crosswalk entry" and a second lane label extends along the width of the same lane and includes a classification of "crosswalk exit_intersection entry," the heading direction of the lane (e.g., from the first lane label to the second lane label) may be determined using this information (e.g., a vehicle would travel in a direction across the first lane label toward the second lane label). In addition, the lane labels may indicate the directionality of the lane (e.g., the angle), and from this information the heading direction (e.g., angle) may be determined—such as by computing the normal of the lane label.

Figure 3A:
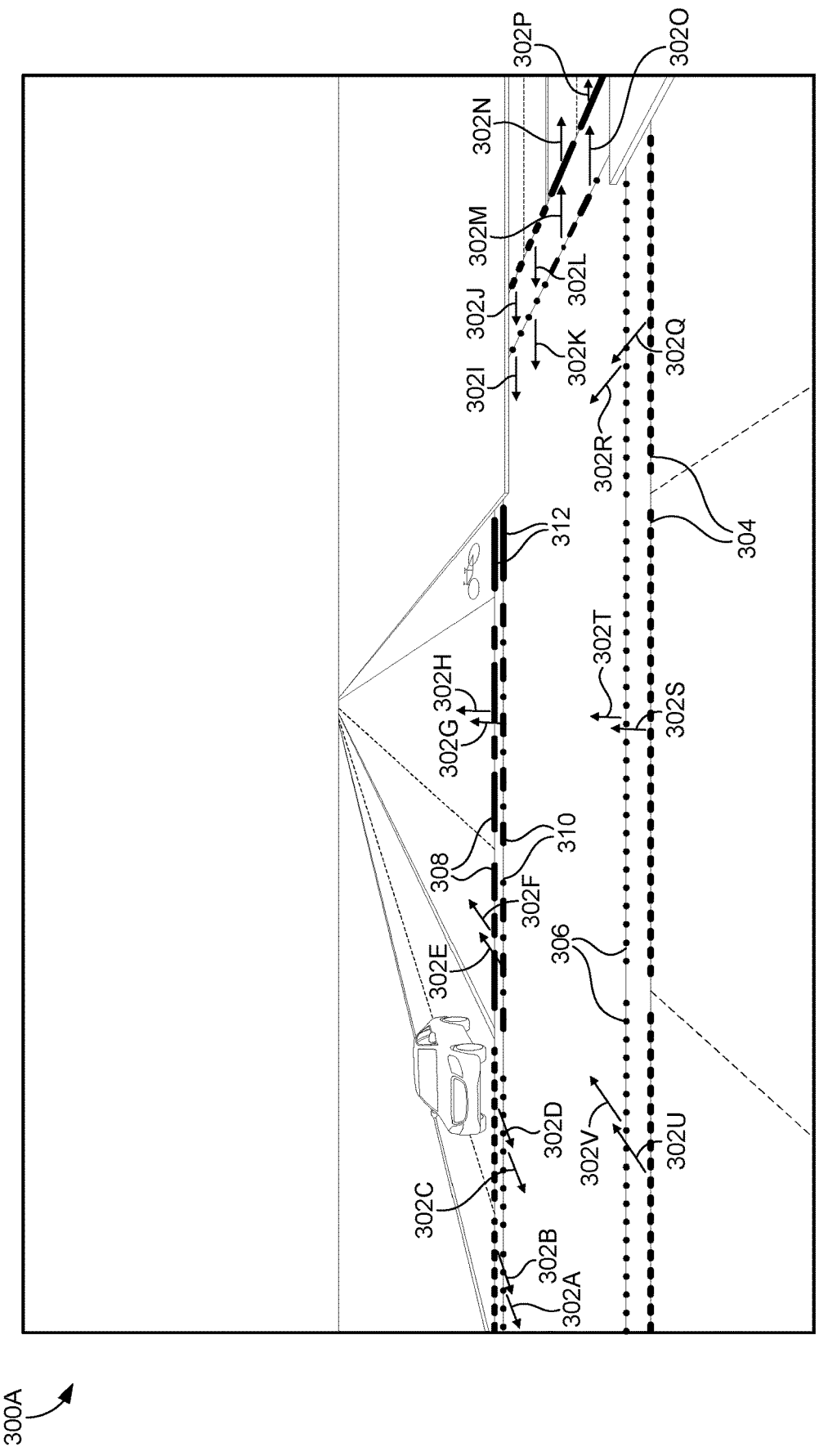
FIGS. 3A-3B are illustrations of example annotations for generating ground truth data for training a neural network to detect intersections, in accordance with some embodiments of the present disclosure.
Figure 3B:
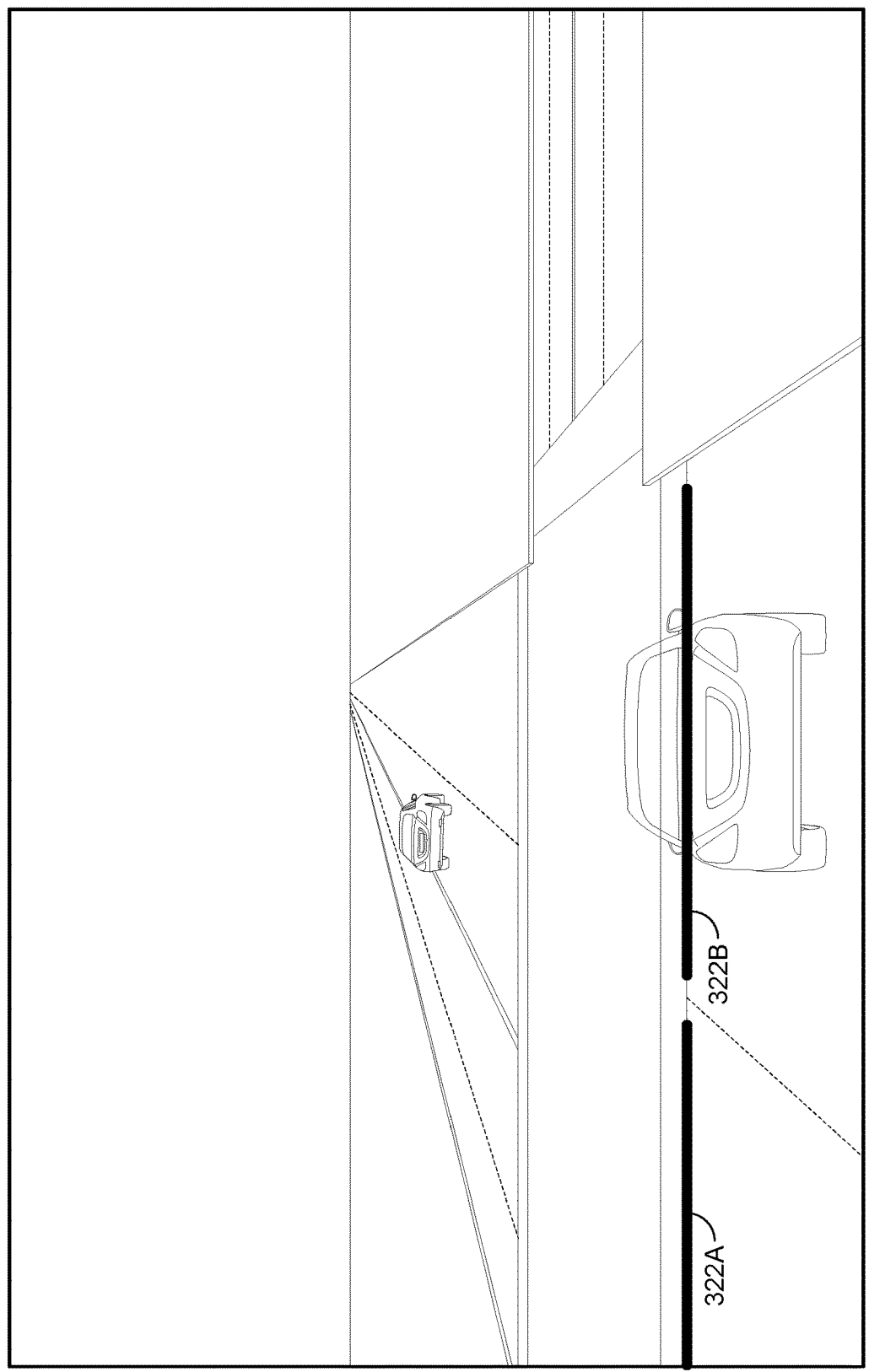

Now referring to FIGS. 3A-3B, FIGS. 3A-3B illustrate example annotations applied to sensor data 102 for use in 2D ground truth data 116 generation for training a DNN(s) 104 to detect intersection structure and pose, in accordance with some embodiments of the present disclosure. For example, FIG. 3A illustrates an example labeling (e.g., corresponding to annotations) of an image 300A that may be used to generate 2D ground truth data 116 in accordance with the training process 100 of FIG. 1. Lanes in an image may be annotated with lane labels (e.g., lanes 304, 306, 310, and 312) and corresponding classifications (e.g., pedestrian entry, intersection exit, intersection entry, pedestrian exit, no lane). For example, lanes 304 may be labeled using line segments and classified as one or more of intersection entry and pedestrian entry. Similarly, lanes 306, lanes 308, and lanes 310 may be labeled using line segments, where lanes 306 may be classified as one or more of intersection entry and pedestrian exit, lanes 308 may be classified as one or more of intersection entry and pedestrian exit, and lanes 312 may be classified as no lane.

Further, labels for the lanes 304, 306, and 308 may further be annotated with a corresponding heading direction, as indicated by arrows 302A-302V. The heading direction may represent a direction of the traffic pertaining to a certain lane. In some examples, the heading directions may be associated with a center (or key) point of its corresponding lane label. For example, heading direction 302S may be associated with a center point of lane 304. The different classification labels may be represented in FIG. 3A by different line types—e.g., solid lines, dashed lines, etc.—to represent different classifications. However, this is not intended to be limiting, and any visualization of the lane labels and their classifications may include different shapes, patterns, fills, colors, symbols, and/or other identifiers to illustrate differences in classification labels for features (e.g., lanes) in the images.

Referring now to FIG. 3B, FIG. 3B illustrates another example of annotations applied to sensor data to train a machine learning model to detect intersection structure and pose, in accordance with some embodiments of the present invention. Here, lanes 322A and 322B in image 300B may be annotated with line segments. The line segment corresponding to the lane 322B may be annotated to extend over the vehicle. This may help train the DNN(s) 104 to predict the locations of key points even where the actual locations may be occluded. As a result, the presence of vehicles or other objects in the roadway may not detract from the ability of the system to generate proposed paths through intersections. The annotations may be of similar visual representation for a same classification. As illustrated, lanes 322A and 322B may be classified as intersection entry line stop line. In this way, similarly classified features of the image may be annotated in a similar manner. Further, it should be noted that classifications may be represented using compound nouns. The different classification labels may be represented in FIG. 3B by solid lines, dashed lines, etc. to represent different classifications. Further, the different classification labels may be nouns and/or compound nouns. This is not intended to be limiting, and any naming convention for classifications may be used to illustrate differences in classification labels for features (e.g., lanes) in the images.

An encoder may be configured to encode the 2D ground truth data 116 corresponding to the intersection structure and pose using the annotations. For example, as described herein, even though the annotations may be limited to lane labels and classifications, information such as key points, number of lanes, heading direction, directionality, and/or other structure and pose information may be determined from the annotations. Once this information is determined, the information may be encoded by the encoder to generate the 2D ground truth data 116. For example, the heading angle corresponding to a lane may be determined using a normal to the direction of the line segment corresponding to the lane, and the heading direction may be determined using semantic or classification information (e.g., where the line segment corresponds to a crosswalk entry and the next line segment after the line segment corresponds to a crosswalk exit and intersection entry, the heading direction may be determined to be from the line segment towards the next line segment, heading into the intersection). Once the directionality (e.g., the angle or other geometry of the lane) is determined from the annotations, a directional vector may be determined and attributed to the line segment—such as to the key point(s) (e.g., the center key point) representing the line segment. Similarly, once the heading is determined (e.g., from the directionality—as the normal thereto—or otherwise), a heading vector may be determined and attributed to the line segment—such as to the key point(s)

representing the line segment. For example, once the heading (e.g., the angle corresponding to the direction of travel of vehicles along the lane) is determined, a heading vector may be determined and attributed to the line segment—such as to the key point(s) representing the line segment.

Once the 2D ground truth data 116 is generated for each instance of the sensor data 102 (e.g., for each image where the sensor data 102 includes image data), the DNN(s) 104 may be trained using the 2D ground truth data 116 to compute 3D intersection structure (e.g., including locations of line segments of the intersection as well as semantic information associated therewith) directly. For example, the DNN(s) 104 may generate output(s) 106, and the output(s) 106 may be compared—using the loss function(s) 114—to the 2D ground truth data 116 corresponding to the respective instance of the sensor data 102 and/or 3D geometric consistency constraints 118. For example, with respect to the 2D ground truth data 116, the 3D outputs 108 of the DNN(s) 104 may be converted—e.g., using a 3D-to-2D converter 112—to 2D space for comparison to the 2D ground truth data 116 using one or more loss functions 114.

The DNN(s) 104 may initially output arbitrarily initialized values of (x, y, z) coordinates in 3D world-space (e.g., the 3D outputs 108) which will improve over time using the loss functions 114. For example, the 3D outputs 108 may correspond to 3D world-space locations of key points corresponding to line segments that delineate an intersection depicted in the sensor data 102 (e.g., 2D camera images, or other 2D image data representations). As such, a center key point and/or end key points—each including corresponding (x, y, z) locations in 3D world space relative to an origin (e.g., a point on the vehicle, such as a center of an axle, a front-most point of the vehicle, a top-most point of the vehicle, etc.) of the vehicle 800—may be used (e.g., connected) to generate line segments corresponding to intersections. For example, the 3D outputs 108 may be computed as confidences for each point in 3D world-space (e.g., for each (x, y, z) coordinate in a target or design space) as to whether the point corresponds to a key point (and/or line segment). When incorporating the semantic information 110, each point in 3D world space may have an associated confidence for each type of semantic class, and a threshold confidence may be used to filter out points that have no semantic class above the threshold confidence. As such, where a point has above threshold confidence for any class(es), the prediction may be that there is a key point (or line segment) at that location, and the key point (or line segment) is of the class(es) above the threshold confidence.

However, because generating a large enough amount of accurate and reliable 3D ground truth data may be challenging, the process 100 may train the DNN(s) 104 using the 2D ground truth data 116. As such, the predicted locations in 3D world-space of the intersection key points—or line segments corresponding thereto—may be converted to 2D space using the 3D-to-2D converter. For example, the 3D-to-2D converter may use intrinsic (e.g., optical center, focal length, skew coefficient, etc.) and/or extrinsic (e.g., sensor location in 3D world-space (e.g., relative to an origin of the vehicle 800), rotation, translation, transformation from 3D world-space to 3D camera coordinate system, etc.) parameters of the sensor that generated the instance of the sensor data 102 to convert the values from 3D world-space to 2D image-space.

The 2D from 3D converted locations of the intersection key points (or line segments constructed therefrom) may then be compared to the known 2D locations of the key points (or line segments) in the 2D ground truth data 116. For example, the 2D ground truth data 116 may include a set of polyline segments with semantic and/or directional information corresponding thereto (e.g., as described with respect to FIGS. 3A-3B) and/or a set of polygon areas that denote potential areas of contention in an intersection along with semantic information corresponding thereto (e.g., as described with respect to FIGS. 2A-2B). In some embodiments, in addition to or alternatively from the 2D ground truth data 116 formats described herein, other 2D ground truth data 116 formats or styles may be used without departing from the scope of the present disclosure. In any embodiment, the 3D coordinate predictions (e.g., 3D outputs 108) of the DNN(s) 104 may be projected to the same 2D (e.g., image) space as the 2D ground truth data 116, and a loss function 114 may be used to compare the distance between the 2D ground truth data 116 and the converted 2D locations of intersection features. By minimizing the distance, the prediction accuracy of the DNN(s) 104 is improved and, over time, the DNN(s) 104 learns to map between 2D intersection structure information extracted from the (e.g., 2D) sensor data 102 and 3D intersection structure in 3D world-space. In addition, for each key point and/or line segment, the semantic information 110 output by the DNN(s) 104 may be compared to the semantic information from the 2D ground truth data 116. Further, the 3D outputs 108 may include directional vectors and/or the semantic information 110 may indicate a direction corresponding to the key points and/or line segments. As such, this information from the outputs 106 may be used to determine directions associated with the key points and/or line segments which may be compared to the directional vectors and/or heading information from the 2D ground truth data 116 (as described herein, such as with respect to FIGS. 3A-3B).

Figure 4:
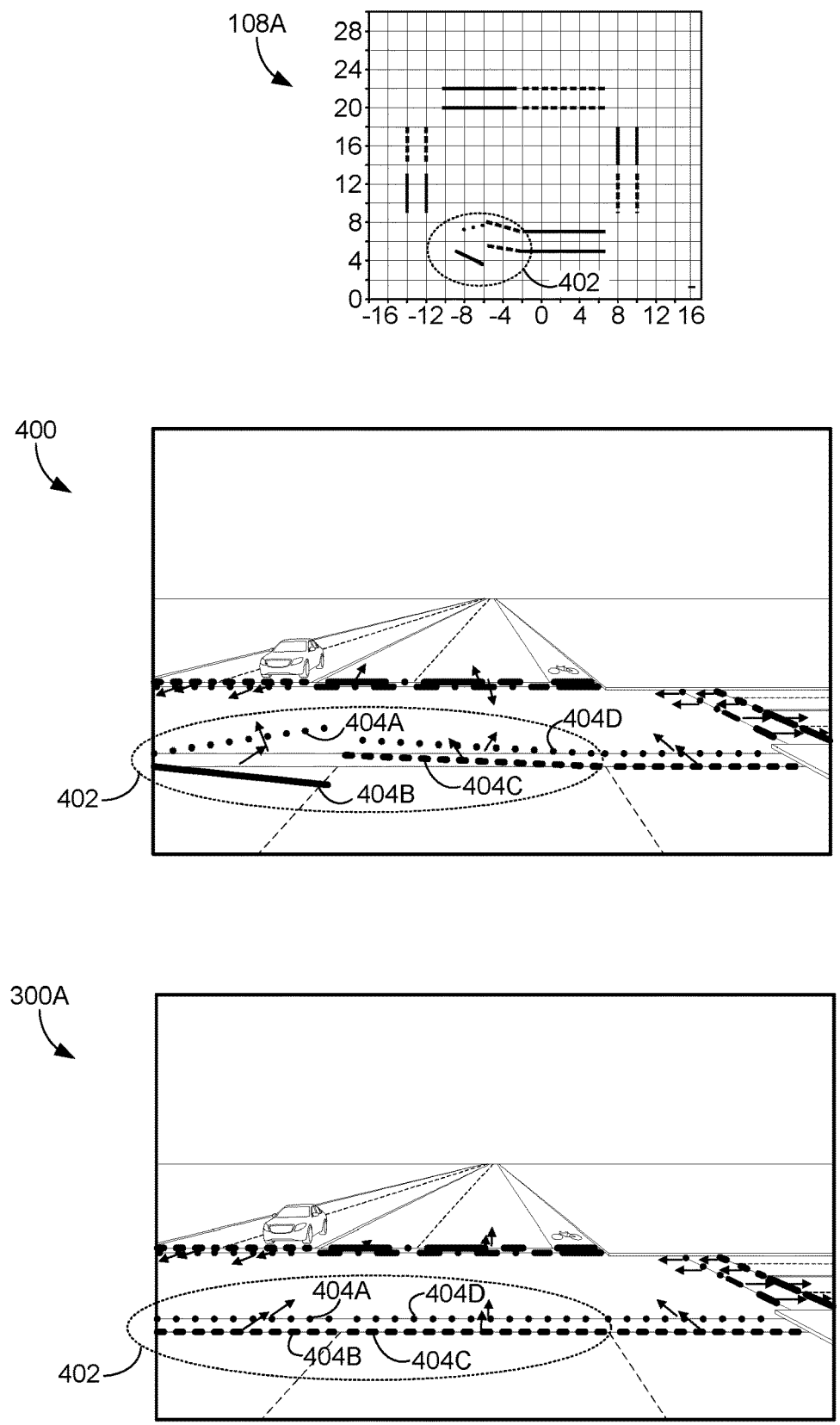
FIG. 4 is an example illustration of converting 3D predictions to two-dimensional (2D) space for training a neural network, in accordance with some embodiments of the present disclosure.

As an example and with respect to FIG. 4, FIG. 4 is an example illustration of converting 3D outputs 108 to 2D space for training a neural network, in accordance with some embodiments of the present disclosure. For example, 3D output 108A may correspond to a visualization of a 3D output 108 of the DNN(s) 104 corresponding to an instance of the sensor data 102—e.g., an instance corresponding to the 2D ground truth data 116 of image 300A of FIGS. 3A and 4. The 3D output 108A may include an origin of (0, 0, 0) corresponding to some origin point on the vehicle, and may extend from left to right laterally up to an extent of a design or target space, forward and back longitudinally to an extend of the design space, and up-down vertically to an extent of the design space (not pictured, due to top-down view). In non-limiting embodiments, the design space may be 40 meters wide (e.g., x-axis), 100 meters long (e.g., y-axis), and 3 meters high (e.g., z-axis). However, any design space may be used. The design space may be selected based on an analysis of a plurality of intersections (e.g., hundreds, thousands, etc.) to determine the average, mean, or other value corresponding to the dimensions of the intersections such that the design space is likely to be at least as large as any intersection that the vehicle may come across. In the example visualization of FIG. 4, the lateral (x-axis) extent shown stretches from −16 meters to +16 meters, the longitudinal (y-axis) extent shown stretches from 0 meters to 28 meters, and the vertical extent (not pictured due to top-down visualization) stretches from 0 to 3 meters. As such, the 3D outputs 108 of the DNN(s) 104 may be predicted within the design space. In the example of FIG. 4, the 3D outputs may be converted to 2D image-space using the 3D-to-2D converter 112, as illustrated in visualization 400. For example, visualization 400 may include the 2D converted predictions of the DNN(s) 104 overlaid on the image 300A, and the image 300A may include the 2D ground truth data 116 corresponding to the image. As such, the loss function 114 corresponding to the 2D ground truth data 116 may be used to compare the distances and/or semantic information of the converted outputs of the DNN(s) 104 to the 2D ground truth data 116. As illustrated in FIG. 4, the 2D converted outputs indicate that, within dashed region 402, there are inaccuracies. For example, line segments 404A-404D in the 3D-to-2D converted outputs of visualization 400 do not line up directionally with the respective line segments 404A-404D in the image 300A. Similarly, semantic information associated with line segment 404B does not line up with semantic information of line segment 404B from the 2D ground truth data 116. As such, the loss function 114 may be used to compute the distances and/or differences between locations, directionality, semantic information, and/or other information of the 3D-to-2D converted outputs and the 2D ground truth data 116.

In some embodiments, in addition to or alternatively from the 2D ground truth data 116 loss function, a 3D geometric consistency constraint 118 loss function may be used. For example, based on empirical knowledge of real-world intersections and intersection design, various 3D geometric constraints may be determined and used for comparison against the computed 3D outputs 108 of the DNN(s) 104. For example, a 3D geometric consistency constraint 118 may include a smoothness term because, on a macro scale, there are no quantum leaps in the physical 3D real-world. As such, 3D outputs 108 that include non-smooth predictions—e.g., line segments that are completely disjointed, line segments offset from one another in any of x, y, and/or z directions, and/or otherwise non-smooth line segments—may be penalized using a loss function 114 corresponding to the 3D geometric consistency. Another 3D geometric consistency constraint 118 may include a straight line constraint based on knowledge that real-world intersections are designed to have straight entry/exit lines, and line segments of intersections are generally linear. As such, 3D outputs 108 that include non-straight line segments (e.g., after generating the line segments using the key points) may be penalized using the loss function 114 corresponding to the 3D geometric consistency. Similarly, statistical variability of lane widths may be used as a 3D geometric consistency constraint 118 such that line segments longer than a threshold length attributed to the statistical variability of lane width may be penalized and line segments that are shorter than a threshold length attributed to the statistical variability of lane width may be penalized, with larger differences being penalized more, in examples. For example, in the United States, the average lane width may be 3.5 meters, so the statistical variability may result in an acceptable range of 3.25 meters to 3.75 meters, as a non-limiting example. As such, where the 3D outputs 108 indicate lanes of 2.5 meters or 5 meters, these outputs may be penalized using the 3D geometric consistency constraint 118 loss function 114. The 3D geometric consistency constraints 118 described herein are not intended to be limiting, and additional or alternative constraints may be used without departing from the scope of the present disclosure.

As such, feedback from the loss function(s) 114 may be used to update parameters (e.g., weights and biases) of the DNN(s) 104 in view of the 2D ground truth data 116 and/or the 3D geometric consistency constraints 118 until the DNN(s) 104 converges to an acceptable or desirable accuracy. Using the process 100, the DNN(s) 104 may be trained to accurately predict the output(s) 106—e.g., 3D outputs 108 and/or semantic information 110—from the sensor data 102 using the loss function(s) 114, the 2D ground truth data 116, and the 3D geometric consistency constraints. As described herein, in some examples, different loss functions 114 may be used to train the DNN(s) 104 to predict different outputs 106. For example, a first loss function 114 may be used for comparing the 3D to 2D converted outputs 106 to the 2D ground truth data and a second loss function 114 for comparing the 3D outputs to the 3D geometric consistency constraints 118. In such an example, the two or more loss functions 114 may be weighted (e.g., equally, differently, etc.) to generate final loss values that may be used to update the parameters of the DNN(s) 104.

Figure 5:
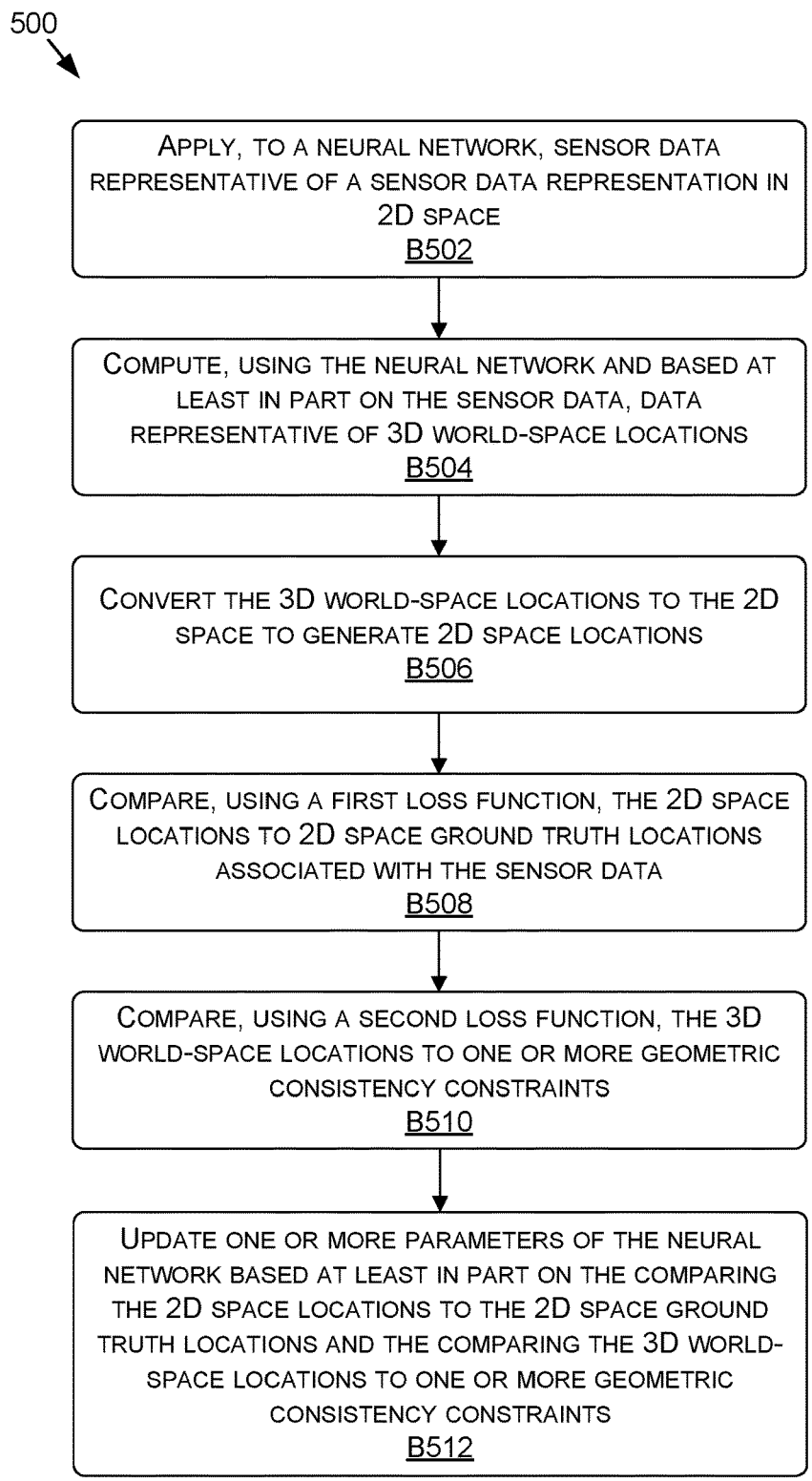
FIG. 5 is a flow diagram illustrating an example method for training a neural network to detect intersections, in accordance with some embodiments of the present disclosure.

Now referring to FIG. 5, each block of method 500, described herein, comprises a computing process that may be performed using any combination of hardware, firmware, and/or software. For instance, various functions may be carried out by a processor executing instructions stored in memory. The method 500 may also be embodied as computer-usable instructions stored on computer storage media. The method 500 may be provided by a standalone application, a service or hosted service (standalone or in combination with another hosted service), or a plug-in to another product, to name a few. In addition, method 500 is described, by way of example, with respect to the process 100 of FIG. 1. However, these methods may additionally or alternatively be executed by any one process and/or any one system, or any combination of processes and/or systems, including, but not limited to, those described herein.

FIG. 5 is a flow diagram illustrating an example method 500 for training a neural network to detect intersections, in accordance with some embodiments of the present disclosure. The method 500, at block B502, includes applying, to a neural network, sensor data representative of a sensor data representation in 2D space. For example, the sensor data 102 representative of an image (or other sensor data representation) may be applied to the DNN(s) 104.

The method 500, at block B504, includes computing, using the neural network and based at least in part on the sensor data, data representative of 3D world-space locations. For example, the DNN(s) 104 may compute the outputs 106—and specifically the 3D outputs 108, in embodiments—after processing the sensor data 102.

The method 500, at block B506, includes converting the 3D world-space locations to the 2D space to generate 2D space locations. For example, the 3D-to-2D converter 112 may convert the 3D outputs 108 to 2D (image) space using the intrinsic and/or extrinsic parameters of the sensor that generated the sensor data 102.

The method 500, at block B508, includes comparing, using a first loss function, the 2D space locations to 2D space ground truth locations associated with the sensor data. For example, the 3D to 2D converted outputs of the DNN(s) 104 may be compared to the 2D ground truth data 116 using a first loss function 114.

The method 500, at block B510, includes comparing, using a second loss function, the 3D world-space locations to one or more geometric consistency constraints. For example, the 3D outputs 108 of the DNN(s) 104 may be compared to the 3D geometric consistency constraints 118 using a second loss function.

The method 500, at block B512, includes updating one or more parameters of the neural network based at least in part on the comparing the 2D space locations to the 2D space ground truth locations and the comparing the 3D world-space locations to one or more geometric consistency constraints. For example, the DNN(s) 104 may be updated using a training engine or optimizer based on the outputs of the first loss function and the second loss function. This process may be repeated for each instance of sensor data 102 used in training the DNN(s) 104 until the DNN(s) converges to an acceptable level of accuracy.

Deploying a DNN to Compute 3D Intersection Structures

Figure 6A:
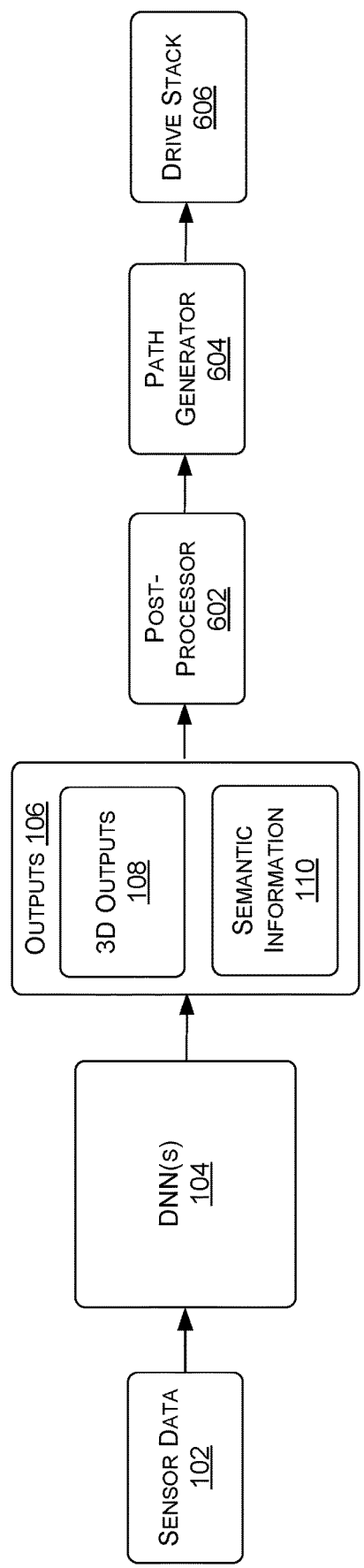
FIG. 6A is a data flow diagram illustrating an example process for detecting intersection structures in 3D world-space using a neural network, in accordance with some embodiments of the present disclosure.

Now referring to FIG. 6A, FIG. 6A is a data flow diagram illustrating an example process 600 for detecting intersection structures in 3D world-space using a neural network, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the training of the neural network 100 according to the process may be implemented, at least in part, using similar components, features, and/or functionality as described herein with respect to example computing device 900 of FIG. 9 and/or example data center 1000 of FIG. 10.

The process 600 may include receiving and/or generating the sensor data 102. For example, the sensor data 102 may be similar to the sensor data 102 described with respect to FIG. 1. For example, the sensor data 102 may be generated during operation of the vehicle 800 using one or more sensor types of the vehicle 800. The sensor data 102—e.g., 2D sensor data—may be applied to the DNN(s) 104, and the DNN(s) 104 may compute the outputs 106. The outputs 106 may include 3D outputs 108, semantic information corresponding to the 3D outputs, and/or directional information corresponding to the 3D outputs (e.g., direction and/or heading associated with each key point and/or line segment), as described herein with respect to FIG. 1.

The DNN(s) 104 may use the sensor data 102 to compute the output(s) 106, which may ultimately be applied to a decoder or one or more other post-processing components to generate key points, classifications, a number of lanes, lane heading, lane directionality, and/or other information. Although examples are described herein with respect to using deep neural networks (DNNs), and specifically convolutional neural networks (CNNs), this is not intended to be limiting. For example, and without limitation, the DNN(s) 104 may include any type of machine learning model, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, long/short term memory/LS™, Hopfield, Boltzmann, deep belief, deconvolutional, generative adversarial, liquid state machine, etc.), lane detection algorithms, computer vision algorithms, and/or other types of machine learning models.

As an example, such as where the DNN(s) 104 include a CNN, the DNN(s) 104 may include any number of layers. One or more of the layers may include an input layer. The input layer may hold values associated with the sensor data 102 (e.g., before or after post-processing). For example, when the sensor data 102 is an image, the input layer may hold values representative of the raw pixel values of the image(s) as a volume (e.g., a width, a height, and color channels (e.g., RGB), such as 32×32×3).

One or more layers may include convolutional layers. The convolutional layers may compute the output of neurons that are connected to local regions in an input layer, each neuron computing a dot product between their weights and a small region they are connected to in the input volume. A result of the convolutional layers may be another volume, with one of the dimensions based on the number of filters applied (e.g., the width, the height, and the number of filters, such as 32×32×12, if 12 were the number of filters).

One or more layers may include deconvolutional layers (or transposed convolutional layers). For example, a result of the deconvolutional layers may be another volume, with a higher dimensionality than the input dimensionality of data received at the deconvolutional layer.

One or more of the layers may include a rectified linear unit (ReLU) layer. The ReLU layer(s) may apply an elementwise activation function, such as the max (0, x), thresholding at zero, for example. The resulting volume of a ReLU layer may be the same as the volume of the input of the ReLU layer.

One or more of the layers may include a pooling layer. The pooling layer may perform a down sampling operation along the spatial dimensions (e.g., the height and the width), which may result in a smaller volume than the input of the pooling layer (e.g., 16×16×12 from the 32×32×12 input volume).

One or more of the layers may include one or more fully connected layer(s). Each neuron in the fully connected layer(s) may be connected to each of the neurons in the previous volume. The fully connected layer may compute class scores, and the resulting volume may be 1×1×number of classes. In some examples, the CNN may include a fully connected layer(s) such that the output of one or more of the layers of the CNN may be provided as input to a fully connected layer(s) of the CNN. In some examples, one or more convolutional streams may be implemented by the DNN(s) 104, and some or all of the convolutional streams may include a respective fully connected layer(s).

In some non-limiting embodiments, the DNN(s) 104 may include a series of convolutional and max pooling layers to facilitate image feature extraction, followed by multi-scale dilated convolutional and up-sampling layers to facilitate global context feature extraction.

Although input layers, convolutional layers, pooling layers, ReLU layers, and fully connected layers are discussed herein with respect to the DNN(s) 104, this is not intended to be limiting. For example, additional or alternative layers may be used in the DNN(s) 104, such as normalization layers, SoftMax layers, and/or other layer types.

In embodiments where the DNN(s) 104 includes a CNN, different orders and numbers of the layers of the CNN may be used depending on the embodiment. In other words, the order and number of layers of the DNN(s) 104 is not limited to any one architecture.

In addition, some of the layers may include parameters (e.g., weights and/or biases), such as the convolutional layers and the fully connected layers, while others may not, such as the ReLU layers and pooling layers. In some examples, the parameters may be learned by the DNN(s) 104 during training. Further, some of the layers may include additional hyper-parameters (e.g., learning rate, stride, epochs, etc.), such as the convolutional layers, the fully connected layers, and the pooling layers, while other layers may not, such as the ReLU layers. The parameters and hyper-parameters are not to be limited and may differ depending on the embodiment.

Figure 6B:
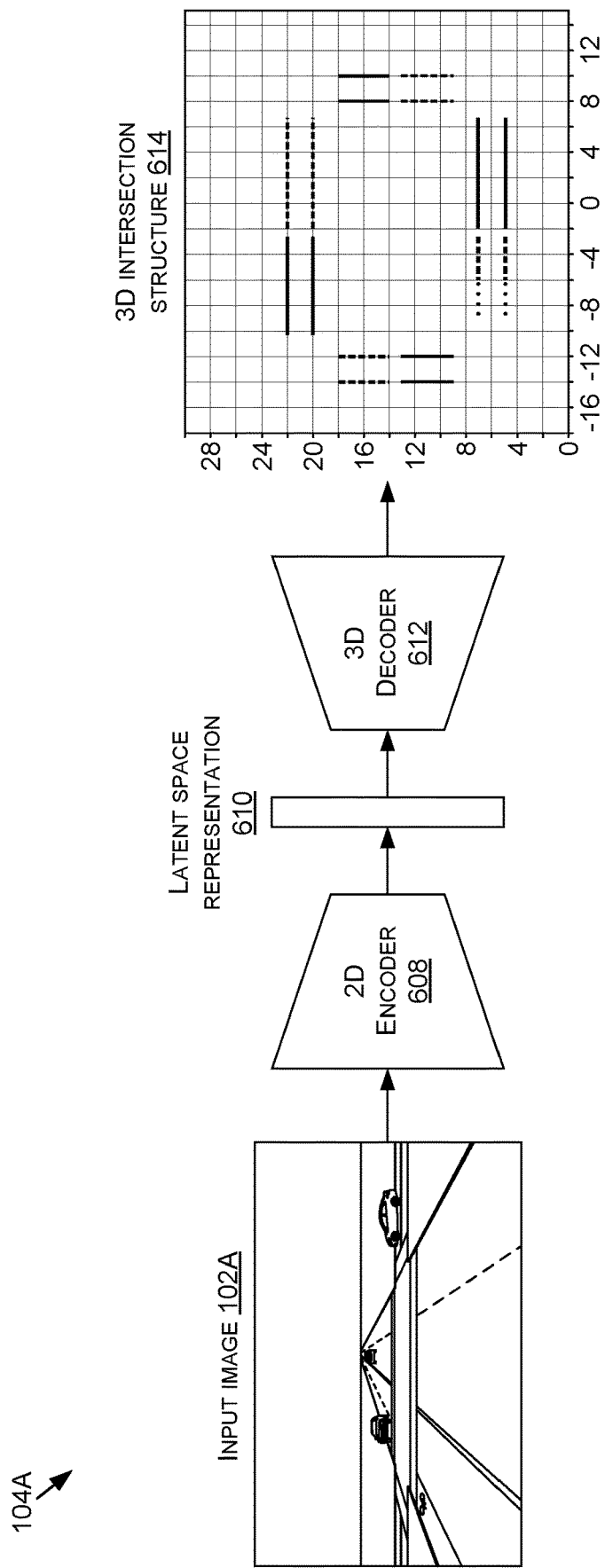
FIG. 6B is an illustration of an example neural network for use in computing intersection structures, in accordance with some embodiments of the present disclosure.

As an example of a DNN, FIG. 6B illustrates an example DNN 104A for use in computing intersection structures, in accordance with some embodiments of the present disclosure. For example, the DNN 104A may include an encoder-decoder type DNN 104—e.g., a first 2D encoder network 608 and a second 3D decoder network 612. For example, during training, the sensor data 102—e.g., input image 602—may go through a set of convolutions layers of the 2D encoder network 608 that learn latent variables (e.g., descriptors for the whole image or other sensor data representation) represented in a latent space representation 610 (e.g., a vector in latent space). The latent space representation 610, in embodiments, may correspond to a high-dimension space vector having some number of members (e.g., 512, 1024, etc.). Similar to image reconstruction tasks, the latent space representation 610 may represent the overall instance of the sensor data 102 (and not just features identified from pixels, for example). As such, the convolutional layers of the encoder network 608 may extract the latent variables. This interim result—e.g., the latent space representation 610—may then be deconvolved using the 3D decoder network 612 to a target or design space for the 3D outputs 108. As a result, the 3D outputs may have a 1:1 mapping in 3D world-space and can thus directly represent the intersection structure within the target or design space. Thus, in contrast to conventional systems where 2D outputs are converted to 3D space—a challenging and inaccurate process that relies on a flat ground assumption—the DNN 104A may compute the 3D outputs 108 directly. For example, similar to the 3D output 108A of FIG. 4, 3D intersection structure 614 may correspond to an accurate representation of the outputs 106 of the DNN 104A after processing a 2D image-space input image 102A. As described herein, the different line labels in the visualization of the 3D intersection structure 614 may correspond to different semantic information 110 associated with each of the line segments that are generated using the computed 3D outputs 108 (e.g., using the key point locations).

Although only a single 2D encoder network 608 processing a single instance of sensor data 102A is illustrated, this is not intended to be limiting. For example, any number of 2D encoder networks 608 may process any number of instances of sensor data 102 from any number of sensors. For example, at any time instance or frame, a first sensor (e.g., first camera, LIDAR sensor, etc.) may generate first sensor data 102 that is processed by a first instance of the 2D encoder network 608 (e.g., trained for the particular type of sensor data input) to compute a first latent space representation 610, a second sensor (e.g., second camera, LIDAR sensor, RADAR sensor, etc.) may generate second sensor data 102 that is processed by a second instance of the 2D encoder network 608 (e.g., trained for the particular type of sensor data input) to compute a second latent space representation 610, and so on. The plurality of latent space representations 610 for the given time instance or frame may then be combined (e.g., concatenated), and the single combined latent space representation 610 may be processed by the 3D decoder network 612 to compute the 3D intersection structure 614. In some embodiments, two or more of the 2D encoder networks 608 may be processed in parallel using parallel processing units of the vehicle 800. As a result, a processing time for any number of 2D encoder networks 608 may be similar or the same as the processing for only a single instance of the 2D encoder network 608, thereby allowing for additional information (e.g., sensor data 102 from a plurality of sensors) to be processed in generating the 3D intersection structure 614.

Referring again to FIG. 6A, the outputs 106 may be processed using a post-processor 602. For example, temporal post-processing may be used to further increase prediction robustness and accuracy. In such an example, the outputs 106 from one or more prior instances of the DNN(s) 104 may be compared (e.g., weighted) against a current output 106 from a current instance of the DNN(s) 104 to generate updated, temporally smoothed results.

The outputs 106—before or after post-processing—may be applied to a path generator 604 that generates paths and/or trajectories for the vehicle 800 to follow in order to navigate the intersection. For example, the semantic information and/or the direction information (e.g., directional vectors, heading directions, etc.) associated with line segments from the 3D intersection structure may be used to determine potential paths through the intersections. In embodiments, the path generator 604 may connect the (center) key points corresponding to line segments according to their 3D world-space coordinates to generate polylines that represent potential paths for traversing the intersection by the vehicle 800 in real-time or near real-time. The final paths may be assigned path types determined relative to the position of the vehicle, the location of the key points, and/or the lane headings (e.g., angles). Potential path types may include, without limitation, left turn, right turn, switch lanes, and/or continue in lane.

In some examples, the path generator 604 may implement curve fitting in order to determine final shapes that most accurately reflect a natural curve of the potential paths. Any known curve fitting algorithms may be used, such as but not limited to, polyline fitting, polynomial fitting, and/or clothoid fitting. The shape of the potential paths may be determined based on the locations of the key points and the corresponding lane heading associated with the key points to be connected. In some examples, the shape of a potential path may be aligned with a tangent of the heading vector at the location of the key points to be connected. The curve fitting process may be repeated for all key points that may potentially be connected to each other to generate all possible paths the vehicle 800 may take to navigate the intersection. In some examples, non-feasible paths may be removed from consideration based on traffic rules and physical restrictions associated with such paths. The remaining potential paths may be determined to be feasible 3D paths or trajectories that the vehicle 800 may take to traverse the intersection.

In some embodiments, the path generator 604 may use a matching algorithm to connect the key points and generate the potential paths for the vehicle 800 to navigate the intersection. In such examples, matching scores may be determined for each pair of key points based on the location of the key points, lane headings corresponding to the key points (e.g., two key points corresponding to different directions of travel will not be connected), and the shape of the fitted curve between the pair of key points. Each key point corresponding to an intersection entry may be connected to multiple key points corresponding to an intersection exit—thereby generating a plurality of potential paths for the vehicle 800. In some examples, a linear matching algorithm such as Hungarian matching algorithm may be used. In other examples, a non-linear matching algorithm such as spectral matching algorithm may be used to connect a pair of key points.

The paths through the intersection may be used to perform one or more operations by an autonomous driving software stack 606 (alternatively referred to herein as "drive stack 606") of the vehicle 800. In some examples, a lane graph may be augmented with the information related to the paths. The lane graph may be input to one or more control component(s) of the vehicle 800 to perform various planning and control tasks. For example, a world model manager may update the world model for aid in navigating the intersection, a path planning layer of the drive stack 606 may use the intersection information to determine the path through the intersection (e.g., along one of the determined potential paths), and/or a control component may determine controls of the vehicle for navigating the intersection according to a determined path.

Figure 7:
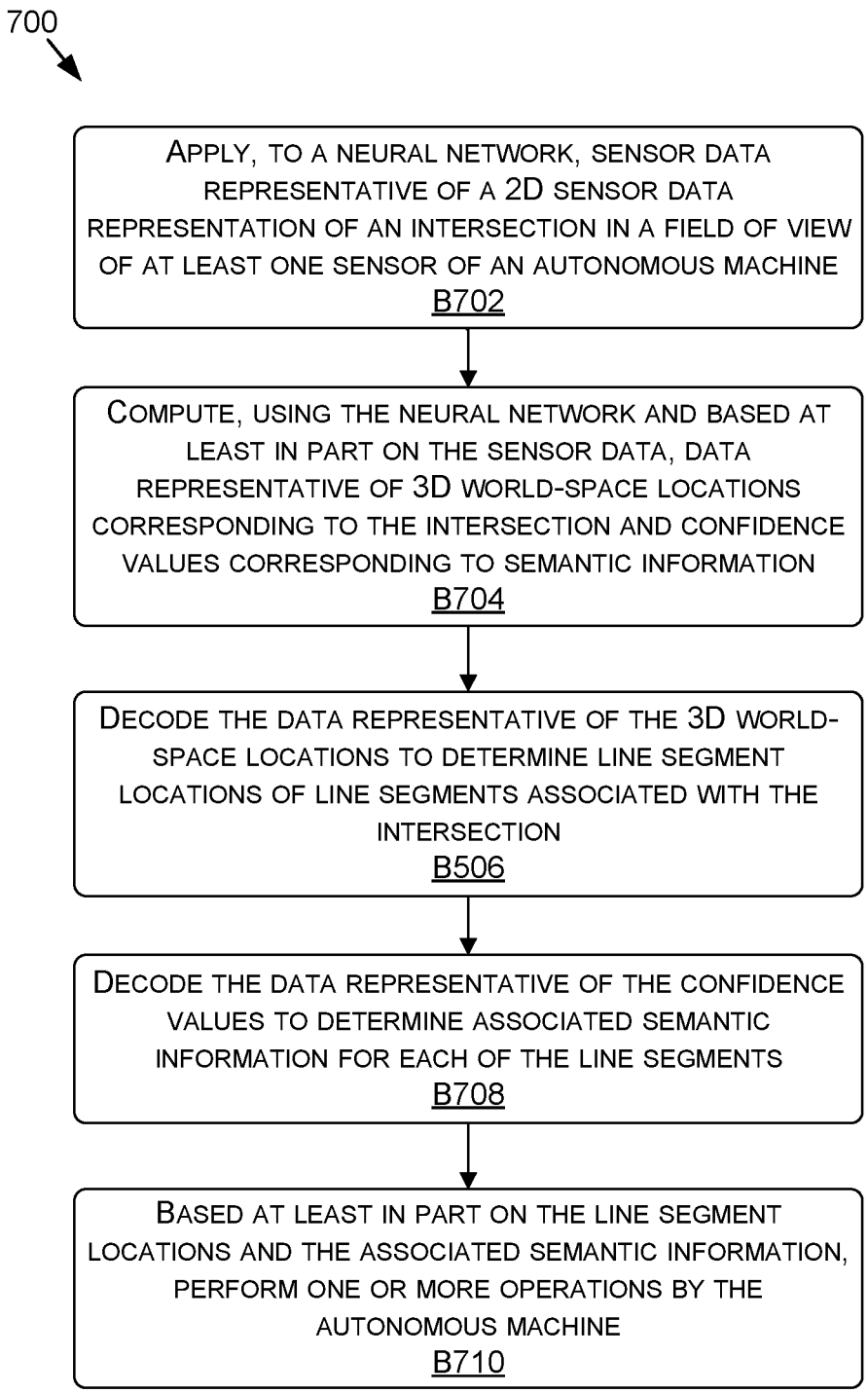
FIG. 7 is a flow diagram illustrating an example method for detecting intersection structures in 3D world-space using a neural network, in accordance with some embodiments of the present disclosure.

Now referring to FIG. 7, each block of method 700, described herein, comprises a computing process that may be performed using any combination of hardware, firmware, and/or software. For instance, various functions may be carried out by a processor executing instructions stored in memory. The method 700 may also be embodied as computer-usable instructions stored on computer storage media. The method 700 may be provided by a standalone application, a service or hosted service (standalone or in combination with another hosted service), or a plug-in to another product, to name a few. In addition, method 700 is described, by way of example, with respect to the process 600 of FIG. 6. However, these methods may additionally or alternatively be executed by any one process and/or any one system, or any combination of processes and/or systems, including, but not limited to, those described herein.

FIG. 7 is a flow diagram illustrating an example method 700 for detecting intersection structures in 3D world-space using a neural network, in accordance with some embodiments of the present disclosure. The method 700, at block B702, includes applying, to a neural network, sensor data representative of a 2D sensor data representation of an intersection in a field of view at least one sensor of an autonomous machine. For example, the sensor data 102 (e.g., an image depicting an intersection) may be applied to the DNN(s) 104.

The method 700, at block B704, includes computing, using the neural network and based at least in part on the sensor data, data representative of 3D world-space locations corresponding to the intersection and confidence values corresponding to semantic information. For example, the DNN(s) 104 may compute the outputs 106—e.g., 3D outputs 108 and semantic information 110—using the sensor data 102.

The method 700, at block B706, includes decoding the data representative of the 3D world-space locations to determine line segment locations of line segments associated with the intersections. For example, the 3D outputs 108 may correspond to locations of key points, and the key points may indicate 3D locations of line segments of the intersection.

The method 700, at block B708, includes decoding the data representative of the confidence values to determine associated semantic information for each of the line segments. For example, the semantic information 110 may be computed as confidences (or probabilities) corresponding to a plurality of different class types (such as but not limited to those described herein), and the confidence values may be used to determine the semantic information 110—e.g., the class(es) with the highest confidence values (or confidence values above a threshold) may be attributed to the particular key points and/or line segments.

The method 700, at block B710, includes, based at least in part on the line segment locations and the associated semantic information, performing one or more operations by the autonomous machine. For example, the outputs 106 may be used by path generator 604 for generating a path(s) for the vehicle 800 through the intersection and/or the outputs 106 or the paths may be used by a drive stack 606 to perform world model management, path planning, control, and/or other operations.

Example Autonomous Vehicle

FIG. 8A is an illustration of an example autonomous vehicle 800, in accordance with some embodiments of the present disclosure. The autonomous vehicle 800 (alternatively referred to herein as the "vehicle 800") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 800 may be capable of functionality in accordance with one or more of Level 3-Level 5 of the autonomous driving levels. For example, the vehicle 800 may be capable of conditional automation (Level 3), high automation (Level 4), and/or full automation (Level 5), depending on the embodiment.

The vehicle 800 may include components such as a chassis, a vehicle body, wheels (e.g., 2, 4, 6, 8, 18, etc.), tires, axles, and other components of a vehicle. The vehicle 800 may include a propulsion system 850, such as an internal combustion engine, hybrid electric power plant, an all-electric engine, and/or another propulsion system type. The propulsion system 850 may be connected to a drive train of the vehicle 800, which may include a transmission, to enable the propulsion of the vehicle 800. The propulsion system 850 may be controlled in response to receiving signals from the throttle/accelerator 852.

A steering system 854, which may include a steering wheel, may be used to steer the vehicle 800 (e.g., along a desired path or route) when the propulsion system 850 is operating (e.g., when the vehicle is in motion). The steering system 854 may receive signals from a steering actuator 856. The steering wheel may be optional for full automation (Level 5) functionality.

The brake sensor system 846 may be used to operate the vehicle brakes in response to receiving signals from the brake actuators 848 and/or brake sensors.

Controller(s) 836, which may include one or more system on chips (SoCs) 804 (FIG. 8C) and/or GPU(s), may provide signals (e.g., representative of commands) to one or more components and/or systems of the vehicle 800. For example, the controller(s) may send signals to operate the vehicle brakes via one or more brake actuators 848, to operate the steering system 854 via one or more steering actuators 856, to operate the propulsion system 850 via one or more throttle/accelerators 852. The controller(s) 836 may include one or more onboard (e.g., integrated) computing devices (e.g., supercomputers) that process sensor signals, and output operation commands (e.g., signals representing commands) to enable autonomous driving and/or to assist a human driver in driving the vehicle 800. The controller(s) 836 may include a first controller 836 for autonomous driving functions, a second controller 836 for functional safety functions, a third controller 836 for artificial intelligence functionality (e.g., computer vision), a fourth controller 836 for infotainment functionality, a fifth controller 836 for redundancy in emergency conditions, and/or other controllers. In some examples, a single controller 836 may handle two or more of the above functionalities, two or more controllers 836 may handle a single functionality, and/or any combination thereof.

The controller(s) 836 may provide the signals for controlling one or more components and/or systems of the vehicle 800 in response to sensor data received from one or more sensors (e.g., sensor inputs). The sensor data may be received from, for example and without limitation, global navigation satellite systems sensor(s) 858 (e.g., Global Positioning System sensor(s)), RADAR sensor(s) 860, ultrasonic sensor(s) 862, LIDAR sensor(s) 864, inertial measurement unit (IMU) sensor(s) 866 (e.g., accelerometer(s), gyroscope(s), magnetic compass(es), magnetometer(s), etc.), microphone(s) 896, stereo camera(s) 868, wide-view camera(s) 870 (e.g., fisheye cameras), infrared camera(s) 872, surround camera(s) 874 (e.g., 360 degree cameras), long-range and/or mid-range camera(s) 898, speed sensor(s) 844 (e.g., for measuring the speed of the vehicle 800), vibration sensor(s) 842, steering sensor(s) 840, brake sensor(s) (e.g., as part of the brake sensor system 846), and/or other sensor types.

One or more of the controller(s) 836 may receive inputs (e.g., represented by input data) from an instrument cluster 832 of the vehicle 800 and provide outputs (e.g., represented by output data, display data, etc.) via a human-machine interface (HMI) display 834, an audible annunciator, a loudspeaker, and/or via other components of the vehicle 800. The outputs may include information such as vehicle velocity, speed, time, map data (e.g., the HD map 822 of FIG. 8C), location data (e.g., the vehicle's 800 location, such as on a map), direction, location of other vehicles (e.g., an occupancy grid), information about objects and status of objects as perceived by the controller(s) 836, etc. For example, the HMI display 834 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 800 further includes a network interface 824 which may use one or more wireless antenna(s) 826 and/or modem(s) to communicate over one or more networks. For example, the network interface 824 may be capable of communication over LTE, WCDMA, UMTS, GSM, CDMA2000, etc. The wireless antenna(s) 826 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

FIG. 8B is an example of camera locations and fields of view for the example autonomous vehicle 800 of FIG. 8A, in accordance with some embodiments of the present disclosure. The cameras and respective fields of view are one example embodiment and are not intended to be limiting. For example, additional and/or alternative cameras may be included and/or the cameras may be located at different locations on the vehicle 800.

The camera types for the cameras may include, but are not limited to, digital cameras that may be adapted for use with the components and/or systems of the vehicle 800. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 800 (e.g., front-facing cameras) may be used for surround view, to help identify forward facing paths and obstacles, as well aid in, with the help of one or more controllers 836 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 870 that may be used to perceive objects coming into view from the periphery (e.g., pedestrians, crossing traffic or bicycles). Although only one wide-view camera is illustrated in FIG. 8B, there may any number of wide-view cameras 870 on the vehicle 800. In addition, long-range camera(s) 898 (e.g., a long-view stereo camera pair) may be used for depth-based object detection, especially for objects for which a neural network has not yet been trained. The long-range camera(s) 898 may also be used for object detection and classification, as well as basic object tracking.

One or more stereo cameras 868 may also be included in a front-facing configuration. The stereo camera(s) 868 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 868 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 868 may be used in addition to, or alternatively from, those described herein.

Cameras with a field of view that include portions of the environment to the side of the vehicle 800 (e.g., side-view cameras) may be used for surround view, providing information used to create and update the occupancy grid, as well as to generate side impact collision warnings. For example, surround camera(s) 874 (e.g., four surround cameras 874 as illustrated in FIG. 8B) may be positioned to on the vehicle 800. The surround camera(s) 874 may include wide-view camera(s) 870, fisheye camera(s), 360 degree camera(s), and/or the like. Four example, four fisheye cameras may be positioned on the vehicle's front, rear, and sides. In an alternative arrangement, the vehicle may use three surround camera(s) 874 (e.g., left, right, and rear), and may leverage one or more other camera(s) (e.g., a forward-facing camera) as a fourth surround view camera.

Cameras with a field of view that include portions of the environment to the rear of the vehicle 800 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 898, stereo camera(s) 868), infrared camera(s) 872, etc.), as described herein.

FIG. 8C is a block diagram of an example system architecture for the example autonomous vehicle 800 of FIG. 8A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 800 in FIG. 8C are illustrated as being connected via bus 802. The bus 802 may include a Controller Area Network (CAN) data interface (alternatively referred to herein as a "CAN bus"). A CAN may be a network inside the vehicle 800 used to aid in control of various features and functionality of the vehicle 800, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 802 is described herein as being a CAN bus, this is not intended to be limiting. For example, in addition to, or alternatively from, the CAN bus, FlexRay and/or Ethernet may be used. Additionally, although a single line is used to represent the bus 802, this is not intended to be limiting. For example, there may be any number of busses 802, which may include one or more CAN busses, one or more FlexRay busses, one or more Ethernet busses, and/or one or more other types of busses using a different protocol. In some examples, two or more busses 802 may be used to perform different functions, and/or may be used for redundancy. For example, a first bus 802 may be used for collision avoidance functionality and a second bus 802 may be used for actuation control. In any example, each bus 802 may communicate with any of the components of the vehicle 800, and two or more busses 802 may communicate with the same components. In some examples, each SoC 804, each controller 836, and/or each computer within the vehicle may have access to the same input data (e.g., inputs from sensors of the vehicle 800), and may be connected to a common bus, such the CAN bus.

The vehicle 800 may include one or more controller(s) 836, such as those described herein with respect to FIG. 8A. The controller(s) 836 may be used for a variety of functions. The controller(s) 836 may be coupled to any of the various other components and systems of the vehicle 800, and may be used for control of the vehicle 800, artificial intelligence of the vehicle 800, infotainment for the vehicle 800, and/or the like.

The vehicle 800 may include a system(s) on a chip (SoC) 804. The SoC 804 may include CPU(s) 806, GPU(s) 808, processor(s) 810, cache(s) 812, accelerator(s) 814, data store(s) 816, and/or other components and features not illustrated. The SoC(s) 804 may be used to control the vehicle 800 in a variety of platforms and systems. For example, the SoC(s) 804 may be combined in a system (e.g., the system of the vehicle 800) with an HD map 822 which may obtain map refreshes and/or updates via a network interface 824 from one or more servers (e.g., server(s) 878 of FIG. 8D).

The CPU(s) 806 may include a CPU cluster or CPU complex (alternatively referred to herein as a "CCPLEX"). The CPU(s) 806 may include multiple cores and/or L2 caches. For example, in some embodiments, the CPU(s) 806 may include eight cores in a coherent multi-processor configuration. In some embodiments, the CPU(s) 806 may include four dual-core clusters where each cluster has a dedicated L2 cache (e.g., a 2 MB L2 cache). The CPU(s) 806 (e.g., the CCPLEX) may be configured to support simultaneous cluster operation enabling any combination of the clusters of the CPU(s) 806 to be active at any given time.

The CPU(s) 806 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 806 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 808 may include an integrated GPU (alternatively referred to herein as an "iGPU"). The GPU(s) 808 may be programmable and may be efficient for parallel workloads. The GPU(s) 808, in some examples, may use an enhanced tensor instruction set. The GPU(s) 808 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 808 may include at least eight streaming microprocessors. The GPU(s) 808 may use compute application programming interface(s) (API(s)). In addition, the GPU(s) 808 may use one or more parallel computing platforms and/or programming models (e.g., NVIDIA's CUDA).

The GPU(s) 808 may be power-optimized for best performance in automotive and embedded use cases. For example, the GPU(s) 808 may be fabricated on a Fin field-effect transistor (FinFET). However, this is not intended to be limiting and the GPU(s) 808 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 808 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 808 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 808 to access the CPU(s) 806 page tables directly. In such examples, when the GPU(s) 808 memory management unit (MMU) experiences a miss, an address translation request may be transmitted to the CPU(s) 806. In response, the CPU(s) 806 may look in its page tables for the virtual-to-physical mapping for the address and transmits the translation back to the GPU(s) 808. As such, unified memory technology may allow a single unified virtual address space for memory of both the CPU(s) 806 and the GPU(s) 808, thereby simplifying the GPU(s) 808 programming and porting of applications to the GPU(s) 808.

In addition, the GPU(s) 808 may include an access counter that may keep track of the frequency of access of the GPU(s) 808 to memory of other processors. The access counter may help ensure that memory pages are moved to the physical memory of the processor that is accessing the pages most frequently.

The SoC(s) 804 may include any number of cache(s) 812, including those described herein. For example, the cache(s) 812 may include an L3 cache that is available to both the CPU(s) 806 and the GPU(s) 808 (e.g., that is connected both the CPU(s) 806 and the GPU(s) 808). The cache(s) 812 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 804 may include an arithmetic logic unit(s) (ALU(s)) which may be leveraged in performing processing with respect to any of the variety of tasks or operations of the vehicle 800—such as processing DNNs. In addition, the SoC(s) 804 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 806 and/or GPU(s) 808.

The SoC(s) 804 may include one or more accelerators 814 (e.g., hardware accelerators, software accelerators, or a combination thereof). For example, the SoC(s) 804 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 808 and to off-load some of the tasks of the GPU(s) 808 (e.g., to free up more cycles of the GPU(s) 808 for performing other tasks). As an example, the accelerator(s) 814 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 814 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 808, and by using an inference accelerator, for example, a designer may target either the DLA(s) or the GPU(s) 808 for any function. For example, the designer may focus processing of CNNs and floating point operations on the DLA(s) and leave other functions to the GPU(s) 808 and/or other accelerator(s) 814.

The accelerator(s) 814 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 806. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 814 (e.g., the hardware acceleration cluster) may include a computer vision network on-chip and SRAM, for providing a high-bandwidth, low latency SRAM for the accelerator(s) 814. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 804 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 814 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 866 output that correlates with the vehicle 800 orientation, distance, 3D location estimates of the object obtained from the neural network and/or other sensors (e.g., LIDAR sensor(s) 864 or RADAR sensor(s) 860), among others.

The SoC(s) 804 may include data store(s) 816 (e.g., memory). The data store(s) 816 may be on-chip memory of the SoC(s) 804, which may store neural networks to be executed on the GPU and/or the DLA. In some examples, the data store(s) 816 may be large enough in capacity to store multiple instances of neural networks for redundancy and safety. The data store(s) 812 may comprise L2 or L3 cache(s) 812. Reference to the data store(s) 816 may include reference to the memory associated with the PVA, DLA, and/or other accelerator(s) 814, as described herein.

The SoC(s) 804 may include one or more processor(s) 810 (e.g., embedded processors). The processor(s) 810 may include a boot and power management processor that may be a dedicated processor and subsystem to handle boot power and management functions and related security enforcement. The boot and power management processor may be a part of the SoC(s) 804 boot sequence and may provide runtime power management services. The boot power and management processor may provide clock and voltage programming, assistance in system low power state transitions, management of SoC(s) 804 thermals and temperature sensors, and/or management of the SoC(s) 804 power states. Each temperature sensor may be implemented as a ring-oscillator whose output frequency is proportional to temperature, and the SoC(s) 804 may use the ring-oscillators to detect temperatures of the CPU(s) 806, GPU(s) 808, and/or accelerator(s) 814. If temperatures are determined to exceed a threshold, the boot and power management processor may enter a temperature fault routine and put the SoC(s) 804 into a lower power state and/or put the vehicle 800 into a chauffeur to safe stop mode (e.g., bring the vehicle 800 to a safe stop).

The processor(s) 810 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 810 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 810 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 810 may further include a real-time camera engine that may include a dedicated processor subsystem for handling real-time camera management.

The processor(s) 810 may further include a high-dynamic range signal processor that may include an image signal processor that is a hardware engine that is part of the camera processing pipeline.

The processor(s) 810 may include a video image compositor that may be a processing block (e.g., implemented on a microprocessor) that implements video post-processing functions needed by a video playback application to produce the final image for the player window. The video image compositor may perform lens distortion correction on wide-view camera(s) 870, surround camera(s) 874, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 808 is not required to continuously render new surfaces. Even when the GPU(s) 808 is powered on and active doing 3D rendering, the video image compositor may be used to offload the GPU(s) 808 to improve performance and responsiveness.

The SoC(s) 804 may further include a mobile industry processor interface (MIPI) camera serial interface for receiving video and input from cameras, a high-speed interface, and/or a video input block that may be used for camera and related pixel input functions. The SoC(s) 804 may further include an input/output controller(s) that may be controlled by software and may be used for receiving I/O signals that are uncommitted to a specific role.

The SoC(s) 804 may further include a broad range of peripheral interfaces to enable communication with peripherals, audio codecs, power management, and/or other devices. The SoC(s) 804 may be used to process data from cameras (e.g., connected over Gigabit Multimedia Serial Link and Ethernet), sensors (e.g., LIDAR sensor(s) 864, RADAR sensor(s) 860, etc. that may be connected over Ethernet), data from bus 802 (e.g., speed of vehicle 800, steering wheel position, etc.), data from GNSS sensor(s) 858 (e.g., connected over Ethernet or CAN bus). The SoC(s) 804 may further include dedicated high-performance mass storage controllers that may include their own DMA engines, and that may be used to free the CPU(s) 806 from routine data management tasks.

The SoC(s) 804 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 804 may be faster, more reliable, and even more energy-efficient and space-efficient than conventional systems. For example, the accelerator(s) 814, when combined with the CPU(s) 806, the GPU(s) 808, and the data store(s) 816, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 820) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 808.

In some examples, a CNN for facial recognition and vehicle owner identification may use data from camera sensors to identify the presence of an authorized driver and/or owner of the vehicle 800. The always on sensor processing engine may be used to unlock the vehicle when the owner approaches the driver door and turn on the lights, and, in security mode, to disable the vehicle when the owner leaves the vehicle. In this way, the SoC(s) 804 provide for security against theft and/or carjacking.

In another example, a CNN for emergency vehicle detection and identification may use data from microphones 896 to detect and identify emergency vehicle sirens. In contrast to conventional systems, that use general classifiers to detect sirens and manually extract features, the SoC(s) 804 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 858. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 862, until the emergency vehicle(s) passes.

The vehicle may include a CPU(s) 818 (e.g., discrete CPU(s), or dCPU(s)), that may be coupled to the SoC(s) 804 via a high-speed interconnect (e.g., PCIe). The CPU(s) 818 may include an X86 processor, for example. The CPU(s) 818 may be used to perform any of a variety of functions, including arbitrating potentially inconsistent results between ADAS sensors and the SoC(s) 804, and/or monitoring the status and health of the controller(s) 836 and/or infotainment SoC 830, for example.

The vehicle 800 may include a GPU(s) 820 (e.g., discrete GPU(s), or dGPU(s)), that may be coupled to the SoC(s) 804 via a high-speed interconnect (e.g., NVIDIA's NVLINK).

The GPU(s) 820 may provide additional artificial intelligence functionality, such as by executing redundant and/or different neural networks, and may be used to train and/or update neural networks based on input (e.g., sensor data) from sensors of the vehicle 800.

The vehicle 800 may further include the network interface 824 which may include one or more wireless antennas 826 (e.g., one or more wireless antennas for different communication protocols, such as a cellular antenna, a Bluetooth antenna, etc.). The network interface 824 may be used to enable wireless connectivity over the Internet with the cloud (e.g., with the server(s) 878 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 800 information about vehicles in proximity to the vehicle 800 (e.g., vehicles in front of, on the side of, and/or behind the vehicle 800). This functionality may be part of a cooperative adaptive cruise control functionality of the vehicle 800.

The network interface 824 may include a SoC that provides modulation and demodulation functionality and enables the controller(s) 836 to communicate over wireless networks. The network interface 824 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 800 may further include data store(s) 828 which may include off-chip (e.g., off the SoC(s) 804) storage. The data store(s) 828 may include one or more storage elements including RAM, SRAM, DRAM, VRAM, Flash, hard disks, and/or other components and/or devices that may store at least one bit of data.

The vehicle 800 may further include GNSS sensor(s) 858. The GNSS sensor(s) 858 (e.g., GPS, assisted GPS sensors, differential GPS (DGPS) sensors, etc.), to assist in mapping, perception, occupancy grid generation, and/or path planning functions. Any number of GNSS sensor(s) 858 may be used, including, for example and without limitation, a GPS using a USB connector with an Ethernet to Serial (RS-232) bridge.

The vehicle 800 may further include RADAR sensor(s) 860. The RADAR sensor(s) 860 may be used by the vehicle 800 for long-range vehicle detection, even in darkness and/or severe weather conditions. RADAR functional safety levels may be ASIL B. The RADAR sensor(s) 860 may use the CAN and/or the bus 802 (e.g., to transmit data generated by the RADAR sensor(s) 860) for control and to access object tracking data, with access to Ethernet to access raw data in some examples. A wide variety of RADAR sensor types may be used. For example, and without limitation, the RADAR sensor(s) 860 may be suitable for front, rear, and side RADAR use. In some example, Pulse Doppler RADAR sensor(s) are used.

The RADAR sensor(s) 860 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 860 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 800 surroundings at higher speeds with minimal interference from traffic in adjacent lanes. The other two antennae may expand the field of view, making it possible to quickly detect vehicles entering or leaving the vehicle's 800 lane.

Mid-range RADAR systems may include, as an example, a range of up to 860 m (front) or 80 m (rear), and a field of view of up to 42 degrees (front) or 850 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 800 may further include ultrasonic sensor(s) 862. The ultrasonic sensor(s) 862, which may be positioned at the front, back, and/or the sides of the vehicle 800, may be used for park assist and/or to create and update an occupancy grid. A wide variety of ultrasonic sensor(s) 862 may be used, and different ultrasonic sensor(s) 862 may be used for different ranges of detection (e.g., 2.5 m, 4 m). The ultrasonic sensor(s) 862 may operate at functional safety levels of ASIL B.

The vehicle 800 may include LIDAR sensor(s) 864. The LIDAR sensor(s) 864 may be used for object and pedestrian detection, emergency braking, collision avoidance, and/or other functions. The LIDAR sensor(s) 864 may be functional safety level ASIL B. In some examples, the vehicle 800 may include multiple LIDAR sensors 864 (e.g., two, four, six, etc.) that may use Ethernet (e.g., to provide data to a Gigabit Ethernet switch).

In some examples, the LIDAR sensor(s) 864 may be capable of providing a list of objects and their distances for a 360-degree field of view. Commercially available LIDAR sensor(s) 864 may have an advertised range of approximately 800 m, with an accuracy of 2 cm-3 cm, and with support for a 800 Mbps Ethernet connection, for example. In some examples, one or more non-protruding LIDAR sensors 864 may be used. In such examples, the LIDAR sensor(s) 864 may be implemented as a small device that may be embedded into the front, rear, sides, and/or corners of the vehicle 800. The LIDAR sensor(s) 864, in such examples, may provide up to a 120-degree horizontal and 35-degree vertical field-of-view, with a 200 m range even for low-reflectivity objects. Front-mounted LIDAR sensor(s) 864 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 800. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 864 may be less susceptible to motion blur, vibration, and/or shock.

The vehicle may further include IMU sensor(s) 866. The IMU sensor(s) 866 may be located at a center of the rear axle of the vehicle 800, in some examples. The IMU sensor(s) 866 may include, for example and without limitation, an accelerometer(s), a magnetometer(s), a gyroscope(s), a magnetic compass(es), and/or other sensor types. In some examples, such as in six-axis applications, the IMU sensor(s) 866 may include accelerometers and gyroscopes, while in nine-axis applications, the IMU sensor(s) 866 may include accelerometers, gyroscopes, and magnetometers.

In some embodiments, the IMU sensor(s) 866 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 866 may enable the vehicle 800 to estimate heading without requiring input from a magnetic sensor by directly observing and correlating the changes in velocity from GPS to the IMU sensor(s) 866. In some examples, the IMU sensor(s) 866 and the GNSS sensor(s) 858 may be combined in a single integrated unit.

The vehicle may include microphone(s) 896 placed in and/or around the vehicle 800. The microphone(s) 896 may be used for emergency vehicle detection and identification, among other things.

The vehicle may further include any number of camera types, including stereo camera(s) 868, wide-view camera(s) 870, infrared camera(s) 872, surround camera(s) 874, long-range and/or mid-range camera(s) 898, and/or other camera types. The cameras may be used to capture image data around an entire periphery of the vehicle 800. The types of cameras used depends on the embodiments and requirements for the vehicle 800, and any combination of camera types may be used to provide the necessary coverage around the vehicle 800. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 8A and FIG. 8B.

The vehicle 800 may further include vibration sensor(s) 842. The vibration sensor(s) 842 may measure vibrations of components of the vehicle, such as the axle(s). For example, changes in vibrations may indicate a change in road surfaces. In another example, when two or more vibration sensors 842 are used, the differences between the vibrations may be used to determine friction or slippage of the road surface (e.g., when the difference in vibration is between a power-driven axle and a freely rotating axle).

The vehicle 800 may include an ADAS system 838. The ADAS system 838 may include a SoC, in some examples. The ADAS system 838 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 860, LIDAR sensor(s) 864, and/or a camera(s). The ACC systems may include longitudinal ACC and/or lateral ACC. Longitudinal ACC monitors and controls the distance to the vehicle immediately ahead of the vehicle 800 and automatically adjust the vehicle speed to maintain a safe distance from vehicles ahead. Lateral ACC performs distance keeping, and advises the vehicle 800 to change lanes when necessary. Lateral ACC is related to other ADAS applications such as LCA and CWS.

CACC uses information from other vehicles that may be received via the network interface 824 and/or the wireless antenna(s) 826 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 800), while the I2V communication concept provides information about traffic further ahead. CACC systems may include either or both I2V and V2V information sources. Given the information of the vehicles ahead of the vehicle 800, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 860, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 860, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 800 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 800 if the vehicle 800 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 860, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 800 is backing up. Some RCTW systems include AEB to ensure that the vehicle brakes are applied to avoid a crash. RCTW systems may use one or more rear-facing RADAR sensor(s) 860, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 800, the vehicle 800 itself must, in the case of conflicting results, decide whether to heed the result from a primary computer or a secondary computer (e.g., a first controller 836 or a second controller 836). For example, in some embodiments, the ADAS system 838 may be a backup and/or secondary computer for providing perception information to a backup computer rationality module. The backup computer rationality monitor may run a redundant diverse software on hardware components to detect faults in perception and dynamic driving tasks. Outputs from the ADAS system 838 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 804.

In other examples, ADAS system 838 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 838 may be fed into the primary computer's perception block and/or the primary computer's dynamic driving task block. For example, if the ADAS system 838 indicates a forward crash warning due to an object immediately ahead, the perception block may use this information when identifying objects. In other examples, the secondary computer may have its own neural network which is trained and thus reduces the risk of false positives, as described herein.

The vehicle 800 may further include the infotainment SoC 830 (e.g., an in-vehicle infotainment system (IVI)). Although illustrated and described as a SoC, the infotainment system may not be a SoC, and may include two or more discrete components. The infotainment SoC 830 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 800. For example, the infotainment SoC 830 may radios, disk players, navigation systems, video players, USB and Bluetooth connectivity, carputers, in-car entertainment, Wi-Fi, steering wheel audio controls, hands free voice control, a heads-up display (HUD), an HMI display 834, a telematics device, a control panel (e.g., for controlling and/or interacting with various components, features, and/or systems), and/or other components. The infotainment SoC 830 may further be used to provide information (e.g., visual and/or audible) to a user(s) of the vehicle, such as information from the ADAS system 838, autonomous driving information such as planned vehicle maneuvers, trajectories, surrounding environment information (e.g., intersection information, vehicle information, road information, etc.), and/or other information.

The infotainment SoC 830 may include GPU functionality. The infotainment SoC 830 may communicate over the bus 802 (e.g., CAN bus, Ethernet, etc.) with other devices, systems, and/or components of the vehicle 800. In some examples, the infotainment SoC 830 may be coupled to a supervisory MCU such that the GPU of the infotainment system may perform some self-driving functions in the event that the primary controller(s) 836 (e.g., the primary and/or backup computers of the vehicle 800) fail. In such an example, the infotainment SoC 830 may put the vehicle 800 into a chauffeur to safe stop mode, as described herein.

The vehicle 800 may further include an instrument cluster 832 (e.g., a digital dash, an electronic instrument cluster, a digital instrument panel, etc.). The instrument cluster 832 may include a controller and/or supercomputer (e.g., a discrete controller or supercomputer). The instrument cluster 832 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 830 and the instrument cluster 832. In other words, the instrument cluster 832 may be included as part of the infotainment SoC 830, or vice versa.

Figure 8D:
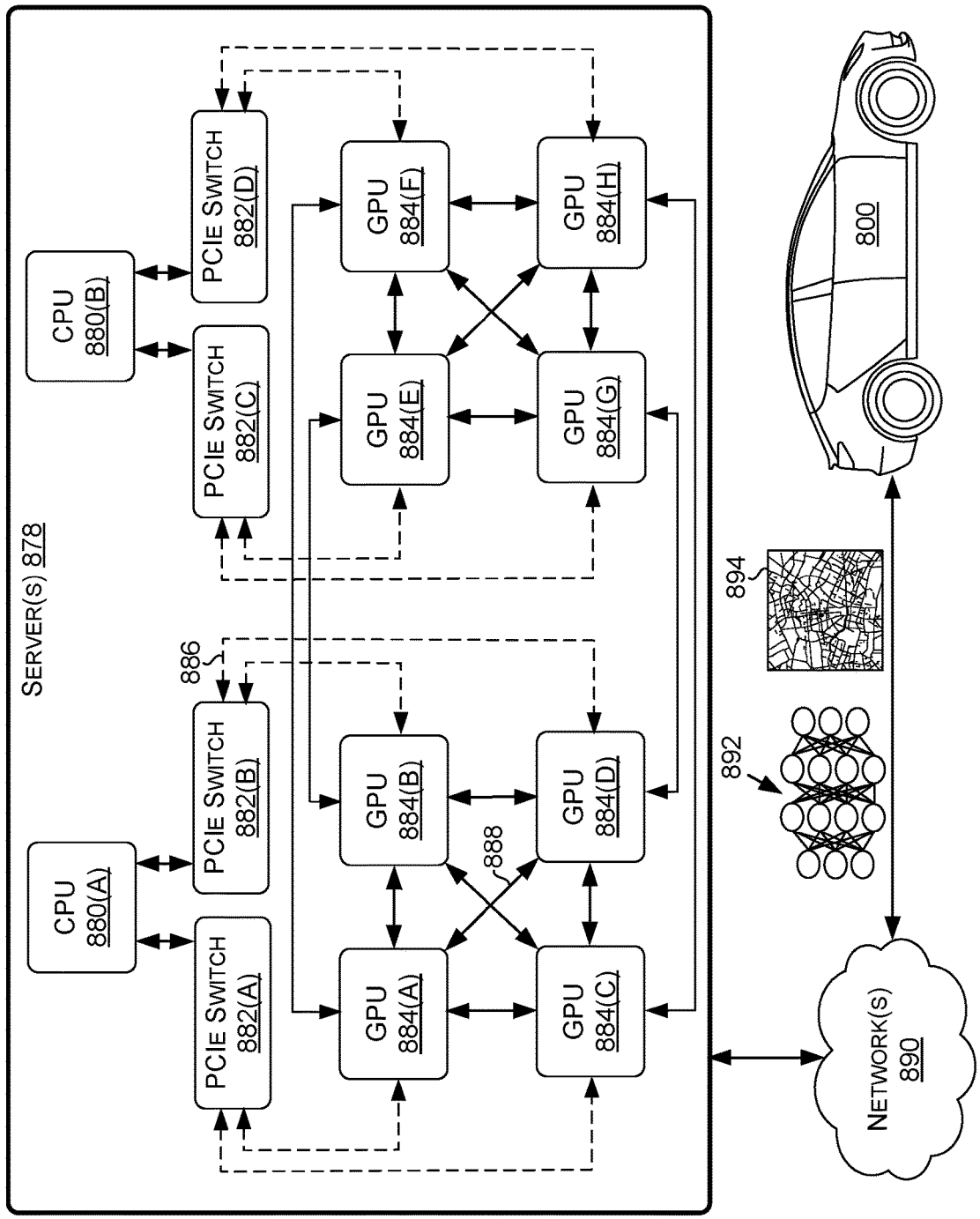
FIG. 8D is a system diagram for communication between cloud-based server(s) and the example autonomous vehicle of FIG. 8A, in accordance with some embodiments of the present disclosure.

FIG. 8D is a system diagram for communication between cloud-based server(s) and the example autonomous vehicle 800 of FIG. 8A, in accordance with some embodiments of the present disclosure. The system 876 may include server(s) 878, network(s) 890, and vehicles, including the vehicle 800. The server(s) 878 may include a plurality of GPUs 884(A)-884(H) (collectively referred to herein as GPUs 884), PCIe switches 882(A)-882(H) (collectively referred to herein as PCIe switches 882), and/or CPUs 880(A)-880(B) (collectively referred to herein as CPUs 880). The GPUs 884, the CPUs 880, and the PCIe switches may be interconnected with high-speed interconnects such as, for example and without limitation, NVLink interfaces 888 developed by NVIDIA and/or PCIe connections 886. In some examples, the GPUs 884 are connected via NVLink and/or NVSwitch SoC and the GPUs 884 and the PCIe switches 882 are connected via PCIe interconnects. Although eight GPUs 884, two CPUs 880, and two PCIe switches are illustrated, this is not intended to be limiting. Depending on the embodiment, each of the server(s) 878 may include any number of GPUs 884, CPUs 880, and/or PCIe switches. For example, the server(s) 878 may each include eight, sixteen, thirty-two, and/or more GPUs 884.

The server(s) 878 may receive, over the network(s) 890 and from the vehicles, image data representative of images showing unexpected or changed road conditions, such as recently commenced road-work. The server(s) 878 may transmit, over the network(s) 890 and to the vehicles, neural networks 892, updated neural networks 892, and/or map information 894, including information regarding traffic and road conditions. The updates to the map information 894 may include updates for the HD map 822, such as information regarding construction sites, potholes, detours, flooding, and/or other obstructions. In some examples, the neural networks 892, the updated neural networks 892, and/or the map information 894 may have resulted from new training and/or experiences represented in data received from any number of vehicles in the environment, and/or based on training performed at a datacenter (e.g., using the server(s) 878 and/or other servers).

The server(s) 878 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 890, and/or the machine learning models may be used by the server(s) 878 to remotely monitor the vehicles.

In some examples, the server(s) 878 may receive data from the vehicles and apply the data to up-to-date real-time neural networks for real-time intelligent inferencing. The server(s) 878 may include deep-learning supercomputers and/or dedicated AI computers powered by GPU(s) 884, such as a DGX and DGX Station machines developed by NVIDIA. However, in some examples, the server(s) 878 may include deep learning infrastructure that use only CPU-powered datacenters.

The deep-learning infrastructure of the server(s) 878 may be capable of fast, real-time inferencing, and may use that capability to evaluate and verify the health of the processors, software, and/or associated hardware in the vehicle 800. For example, the deep-learning infrastructure may receive periodic updates from the vehicle 800, such as a sequence of images and/or objects that the vehicle 800 has located in that sequence of images (e.g., via computer vision and/or other machine learning object classification techniques). The deep-learning infrastructure may run its own neural network to identify the objects and compare them with the objects identified by the vehicle 800 and, if the results do not match and the infrastructure concludes that the AI in the vehicle 800 is malfunctioning, the server(s) 878 may transmit a signal to the vehicle 800 instructing a fail-safe computer of the vehicle 800 to assume control, notify the passengers, and complete a safe parking maneuver.

For inferencing, the server(s) 878 may include the GPU(s) 884 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 9:
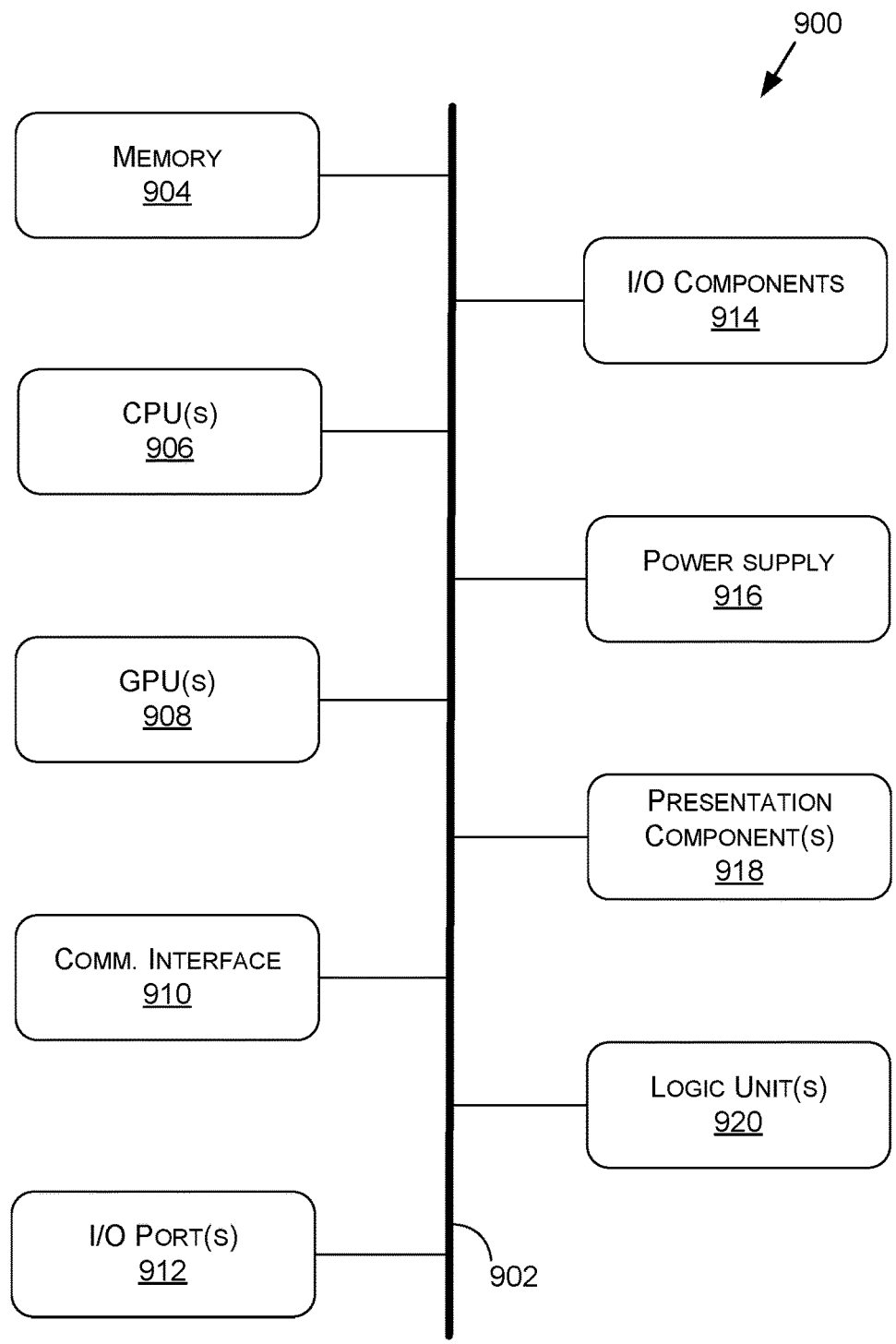
FIG. 9 is a block diagram of an example computing device suitable for use in implementing some embodiments of the present disclosure.

FIG. 9 is a block diagram of an example computing device(s) 900 suitable for use in implementing some embodiments of the present disclosure. Computing device 900 may include an interconnect system 902 that directly or indirectly couples the following devices: memory 904, one or more central processing units (CPUs) 906, one or more graphics processing units (GPUs) 908, a communication interface 910, input/output (I/O) ports 912, input/output components 914, a power supply 916, one or more presentation components 918 (e.g., display(s)), and one or more logic units 920. In at least one embodiment, the computing device(s) 900 may comprise one or more virtual machines (VMs), and/or any of the components thereof may comprise virtual components (e.g., virtual hardware components). For non-limiting examples, one or more of the GPUs 908 may comprise one or more vGPUs, one or more of the CPUs 906 may comprise one or more vCPUs, and/or one or more of the logic units 920 may comprise one or more virtual logic units. As such, a computing device(s) 900 may include discrete components (e.g., a full GPU dedicated to the computing device 900), virtual components (e.g., a portion of a GPU dedicated to the computing device 900), or a combination thereof.

Although the various blocks of FIG. 9 are shown as connected via the interconnect system 902 with lines, this is not intended to be limiting and is for clarity only. For example, in some embodiments, a presentation component 918, such as a display device, may be considered an I/O component 914 (e.g., if the display is a touch screen). As another example, the CPUs 906 and/or GPUs 908 may include memory (e.g., the memory 904 may be representative of a storage device in addition to the memory of the GPUs 908, the CPUs 906, and/or other components). In other words, the computing device of FIG. 9 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 9.

The interconnect system 902 may represent one or more links or busses, such as an address bus, a data bus, a control bus, or a combination thereof. The interconnect system 902 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 906 may be directly connected to the memory 904. Further, the CPU 906 may be directly connected to the GPU 908. Where there is direct, or point-to-point connection between components, the interconnect system 902 may include a PCIe link to carry out the connection. In these examples, a PCI bus need not be included in the computing device 900.

The memory 904 may include any of a variety of computer-readable media. The computer-readable media may be any available media that may be accessed by the computing device 900. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 904 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 900. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 906 may be configured to execute at least some of the computer-readable instructions to control one or more components of the computing device 900 to perform one or more of the methods and/or processes described herein. The CPU(s) 906 may each include one or more cores (e.g., one, two, four, eight, twenty-eight, seventy-two, etc.) that are capable of handling a multitude of software threads simultaneously. The CPU(s) 906 may include any type of processor, and may include different types of processors depending on the type of computing device 900 implemented (e.g., processors with fewer cores for mobile devices and processors with more cores for servers). For example, depending on the type of computing device 900, the processor may be an Advanced RISC Machines (ARM) processor implemented using Reduced Instruction Set Computing (RISC) or an x86 processor implemented using Complex Instruction Set Computing (CISC). The computing device 900 may include one or more CPUs 906 in addition to one or more microprocessors or supplementary co-processors, such as math co-processors.

In addition to or alternatively from the CPU(s) 906, the GPU(s) 908 may be configured to execute at least some of the computer-readable instructions to control one or more components of the computing device 900 to perform one or more of the methods and/or processes described herein. One or more of the GPU(s) 908 may be an integrated GPU (e.g., with one or more of the CPU(s) 906 and/or one or more of the GPU(s) 908 may be a discrete GPU. In embodiments, one or more of the GPU(s) 908 may be a coprocessor of one or more of the CPU(s) 906. The GPU(s) 908 may be used by the computing device 900 to render graphics (e.g., 3D graphics) or perform general purpose computations. For example, the GPU(s) 908 may be used for General-Purpose computing on GPUs (GPGPU). The GPU(s) 908 may include hundreds or thousands of cores that are capable of handling hundreds or thousands of software threads simultaneously. The GPU(s) 908 may generate pixel data for output images in response to rendering commands (e.g., rendering commands from the CPU(s) 906 received via a host interface). The GPU(s) 908 may include graphics memory, such as display memory, for storing pixel data or any other suitable data, such as GPGPU data. The display memory may be included as part of the memory 904. The GPU(s) 908 may include two or more GPUs operating in parallel (e.g., via a link). The link may directly connect the GPUs (e.g., using NVLINK) or may connect the GPUs through a switch (e.g., using NVSwitch). When combined together, each GPU 908 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 906 and/or the GPU(s) 908, the logic unit(s) 920 may be configured to execute at least some of the computer-readable instructions to control one or more components of the computing device 900 to perform one or more of the methods and/or processes described herein. In embodiments, the CPU(s) 906, the GPU(s) 908, and/or the logic unit(s) 920 may discretely or jointly perform any combination of the methods, processes and/or portions thereof. One or more of the logic units 920 may be part of and/or integrated in one or more of the CPU(s) 906 and/or the GPU(s) 908 and/or one or more of the logic units 920 may be discrete components or otherwise external to the CPU(s) 906 and/or the GPU(s) 908. In embodiments, one or more of the logic units 920 may be a coprocessor of one or more of the CPU(s) 906 and/or one or more of the GPU(s) 908.

Examples of the logic unit(s) 920 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 910 may include one or more receivers, transmitters, and/or transceivers that enable the computing device 900 to communicate with other computing devices via an electronic communication network, included wired and/or wireless communications. The communication interface 910 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 912 may enable the computing device 900 to be logically coupled to other devices including the I/O components 914, the presentation component(s) 918, and/or other components, some of which may be built in to (e.g., integrated in) the computing device 900. Illustrative I/O components 914 include a microphone, mouse, keyboard, joystick, game pad, game controller, satellite dish, scanner, printer, wireless device, etc. The I/O components 914 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 900. The computing device 900 may be include depth cameras, such as stereoscopic camera systems, infrared camera systems, RGB camera systems, touchscreen technology, and combinations of these, for gesture detection and recognition. Additionally, the computing device 900 may include accelerometers or gyroscopes (e.g., as part of an inertia measurement unit (IMU)) that enable detection of motion. In some examples, the output of the accelerometers or gyroscopes may be used by the computing device 900 to render immersive augmented reality or virtual reality.

The power supply 916 may include a hard-wired power supply, a battery power supply, or a combination thereof. The power supply 916 may provide power to the computing device 900 to enable the components of the computing device 900 to operate.

The presentation component(s) 918 may include a display (e.g., a monitor, a touch screen, a television screen, a heads-up-display (HUD), other display types, or a combination thereof), speakers, and/or other presentation components. The presentation component(s) 918 may receive data from other components (e.g., the GPU(s) 908, the CPU(s) 906, etc.), and output the data (e.g., as an image, video, sound, etc.).

Example Data Center

Figure 10:
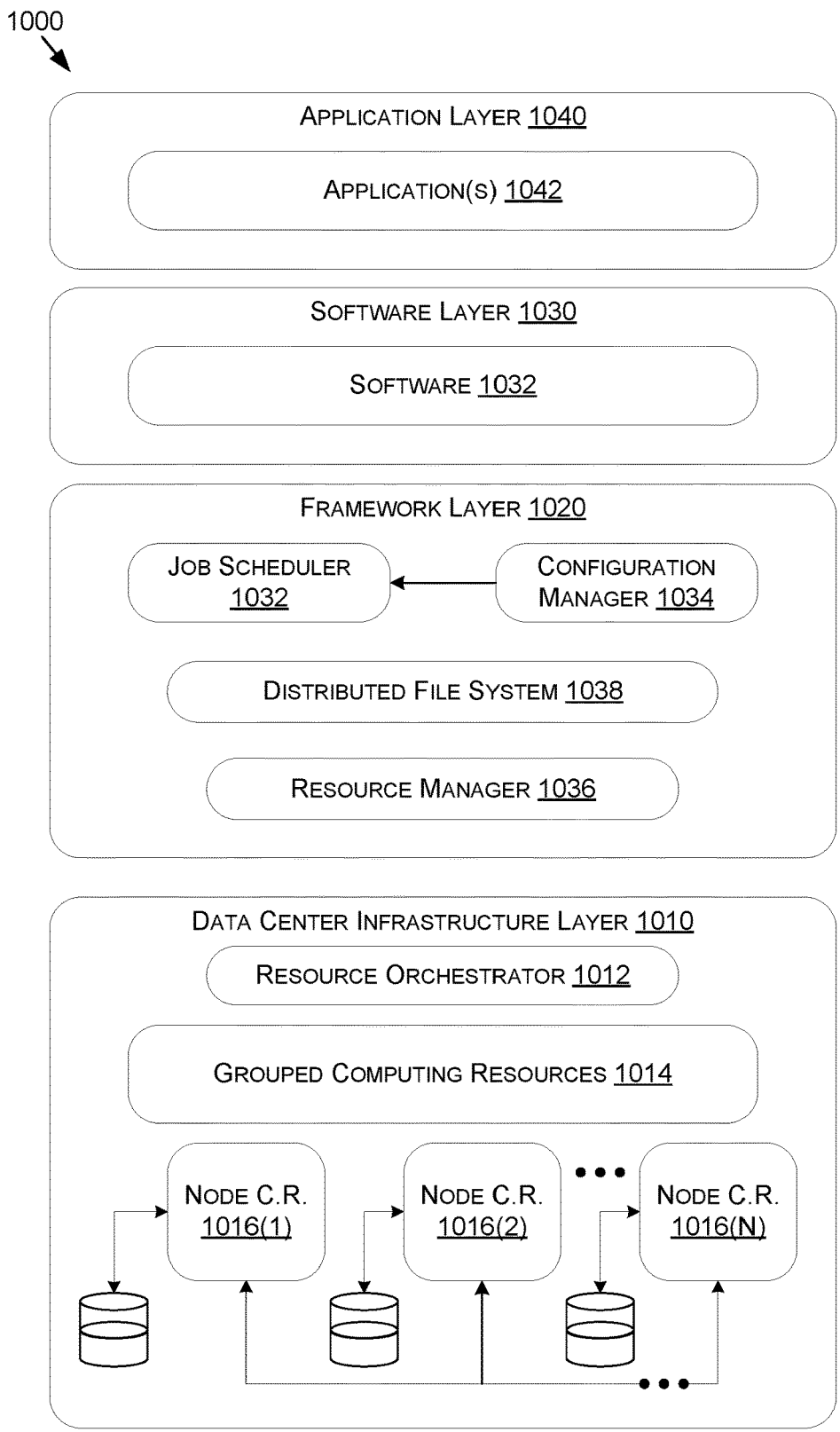
FIG. 10 is a block diagram of an example data center suitable for use in implementing some embodiments of the present disclosure.

FIG. 10 illustrates an example data center 1000 that may be used in at least one embodiments of the present disclosure. The data center 1000 may include a data center infrastructure layer 1010, a framework layer 1020, a software layer 1030, and/or an application layer 1040.

As shown in FIG. 10, the data center infrastructure layer 1010 may include a resource orchestrator 1012, grouped computing resources 1014, and node computing resources ("node C.R.s") 1016(1)-1016(N), where "N" represents any whole, positive integer. In at least one embodiment, node C.R.s 1016(1)-1016(N) may include, but are not limited to, any number of central processing units ("CPUs") or other processors (including accelerators, field programmable gate arrays (FPGAs), graphics processors or graphics processing units (GPUs), etc.), memory devices (e.g., dynamic read-only memory), storage devices (e.g., solid state or disk drives), network input/output ("NW I/O") devices, network switches, virtual machines ("VMs"), power modules, and/or cooling modules, etc. In some embodiments, one or more node C.R.s from among node C.R.s 1016(1)-1016(N) may correspond to a server having one or more of the above-mentioned computing resources. In addition, in some embodiments, the node C.R.s 1016(1)-10161(N) may include one or more virtual components, such as vGPUs, vCPUs, and/or the like, and/or one or more of the node C.R.s 1016(1)-1016(N) may correspond to a virtual machine (VM).

In at least one embodiment, grouped computing resources 1014 may include separate groupings of node C.R.s 1016 housed within one or more racks (not shown), or many racks housed in data centers at various geographical locations (also not shown). Separate groupings of node C.R.s 1016 within grouped computing resources 1014 may include grouped compute, network, memory or storage resources that may be configured or allocated to support one or more workloads. In at least one embodiment, several node C.R.s 1016 including CPUs, GPUs, and/or other processors may be grouped within one or more racks to provide compute resources to support one or more workloads. The one or more racks may also include any number of power modules, cooling modules, and/or network switches, in any combination.

The resource orchestrator 1022 may configure or otherwise control one or more node C.R.s 1016(1)-1016(N)

and/or grouped computing resources 1014. In at least one embodiment, resource orchestrator 1022 may include a software design infrastructure ("SDI") management entity for the data center 1000. The resource orchestrator 1022 may include hardware, software, or some combination thereof.

In at least one embodiment, as shown in FIG. 10, framework layer 1020 may include a job scheduler 1032, a configuration manager 1034, a resource manager 1036, and/or a distributed file system 1038. The framework layer 1020 may include a framework to support software 1032 of software layer 1030 and/or one or more application(s) 1042 of application layer 1040. The software 1032 or application(s) 1042 may respectively include web-based service software or applications, such as those provided by Amazon Web Services, Google Cloud and Microsoft Azure. The framework layer 1020 may be, but is not limited to, a type of free and open-source software web application framework such as Apache Spark™ (hereinafter "Spark") that may utilize distributed file system 1038 for large-scale data processing (e.g., "big data"). In at least one embodiment, job scheduler 1032 may include a Spark driver to facilitate scheduling of workloads supported by various layers of data center 1000. The configuration manager 1034 may be capable of configuring different layers such as software layer 1030 and framework layer 1020 including Spark and distributed file system 1038 for supporting large-scale data processing. The resource manager 1036 may be capable of managing clustered or grouped computing resources mapped to or allocated for support of distributed file system 1038 and job scheduler 1032. In at least one embodiment, clustered or grouped computing resources may include grouped computing resource 1014 at data center infrastructure layer 1010. The resource manager 1036 may coordinate with resource orchestrator 1012 to manage these mapped or allocated computing resources.

In at least one embodiment, software 1032 included in software layer 1030 may include software used by at least portions of node C.R.s 1016(1)-1016(N), grouped computing resources 1014, and/or distributed file system 1038 of framework layer 1020. One or more types of software may include, but are not limited to, Internet web page search software, e-mail virus scan software, database software, and streaming video content software.

In at least one embodiment, application(s) 1042 included in application layer 1040 may include one or more types of applications used by at least portions of node C.R.s 1016(1)-1016(N), grouped computing resources 1014, and/or distributed file system 1038 of framework layer 1020. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1034, resource manager 1036, and resource orchestrator 1012 may implement any number and type of self-modifying actions based on any amount and type of data acquired in any technically feasible fashion. Self-modifying actions may relieve a data center operator of data center 1000 from making possibly bad configuration decisions and possibly avoiding underutilized and/or poor performing portions of a data center.

The data center 1000 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1000. In at least one embodiment, trained or deployed machine learning models corresponding to one or more neural networks may be used to infer or predict information using resources described above with respect to the data center 1000 by using weight parameters calculated through one or more training techniques, such as but not limited to those described herein.

In at least one embodiment, the data center 1000 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 900 of FIG. 9—e.g., each device may include similar components, features, and/or functionality of the computing device(s) 900. In addition, where backend devices (e.g., servers, NAS, etc.) are implemented, the backend devices may be included as part of a data center 1000, an example of which is described in more detail herein with respect to FIG. 10.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 900 described herein with respect to FIG. 9. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
    applying, to one or more neural networks, image data representative of one or more two-dimensional (2D) images depicting one or more features of an intersection located in a field of view of at least one sensor;
    generating, based at least on the one or more neural networks processing the image data, data representative of one or more three-dimensional (3D) world-space locations corresponding to one or more line segments associated with the intersection and one or more confidence values corresponding to semantic information associated with the one or more line segments, the one or more line segments associated with the one or more features associated with the intersection;
    decoding the data representative of the one or more 3D world-space locations to determine one or more locations of the one or more line segments;
    decoding the data representative of the one or more confidence values to determine one or more classifications for the one or more line segments; and
    based at least on the one or more locations of the one or more line segments and the one or more classifications, performing one or more operations by a machine.

2. The method of claim 1, wherein the data representative of the one or more 3D world-space locations includes one or more 3D world-space locations of one or more key points corresponding to the one or more line segments, the one or more key points including, for at least a line segment of the one or more line segments, at least one of an end point or a center point of the line segment.

3. The method of claim 2, further comprising generating, based at least on the one or more neural networks processing the image data, second data representative of a directional vector corresponding to the center point indicative of a direction of travel associated with the line segment.

4. The method of claim 1, further comprising:
    generating, based at least on the one or more neural networks processing the image data, second data representative of directional vectors associated with key points for two or more line segments of the one or more line segments; and
    based at least on the directional vectors, generating one or more potential paths between the two or more line segments,
    wherein the performing the one or more operations includes selecting one of the one or more potential paths.

5. The method of claim 1, wherein the one or more neural networks is trained based at least on converting predicted outputs of the one or more neural networks to 2D space, and comparing the predicted outputs in the 2D space to 2D ground truth data using a loss function.

6. The method of claim 1, wherein the one or more neural networks is trained based at least on comparing 3D outputs of the one or more neural networks to one or more geometrical consistency constraints associated with intersections using a loss function.

7. The method of claim 1, wherein the one or more 3D world-space locations are predicted within a target space having an origin corresponding to a location on the machine, a size of the target space determined based at least on an analysis of a plurality of intersections.

8. The method of claim 1, wherein:
the one or more neural networks includes an encoder portion that processes the image data to compute a latent space vector; and
the one or more neural networks includes a decoder portion that processes the latent space vector to generate the data representative of the one or more 3D world-space locations corresponding to the one or more line segments associated with the intersection and the one or more confidence values corresponding to the semantic information associated with the one or more line segments.

9. The method of claim 8, wherein:
the at least one sensor includes a first sensor that generates a first subset of the image data and a second sensor that generates a second subset of the image data;
the encoder portion of the one or more neural networks includes a first encoder instance that processes the first subset of the image data to generate a first portion of the latent space vector and a second encoder instance that processes the second subset of the image data to generate a second portion of the latent space vector; and
the latent space vector is generated based at least on concatenating the first portion and the second portion.

10. The method of claim 9, wherein the first encoder instance and the second encoder instance are executed in parallel using one or more parallel processing units.

11. The method of claim 1, wherein the one or more features comprise at least one of:
one or more road marking associated with the intersection;
one or more entrance lines generated for the intersection; or
one or more exit lines generated for the intersection.

12. A method comprising:
applying, to one or more neural networks, first data representative of a first representation in a two-dimensional (2D) space, the first data generated using at least one sensor;
generating, based at least on the one or more neural networks processing the first data, second data representative of a second representation of one or more three-dimensional (3D) world-space locations;
converting the one or more 3D world-space locations to the 2D space to generate one or more 2D space locations associated with the first representation;
comparing the one or more 2D space locations to one or more 2D space ground truth locations within the first representation; and
updating one or more parameters of the one or more neural networks based at least on the comparing.

13. The method of claim 12, wherein the comparing is executed using a loss function and the method further comprises:
comparing, using another loss function, the one or more 3D world-space locations to one or more geometric consistency constraints,
wherein the updating the one or more parameters of the one or more neural networks is further based at least on the comparing the one or more 3D world-space locations to the one or more geometric consistency constraints.

14. The method of claim 13, wherein the one or more 3D world-space locations correspond to one or more line segments of an intersection, and the one or more geometric consistency constraints include at least one of a smoothness constraint corresponding to the one or more line segments, a straight line constraint corresponding to the one or more line segments, or a lane width constraint corresponding to the one or more line segments.

15. The method of claim 12, wherein:
the one or more neural networks includes an encoder portion that processes the first data to compute a latent space vector; and
the one or more neural networks includes a decoder portion that processes the latent space vector to generate the second data representative of the one or more 3D world-space locations.

16. A processor comprising:
one or more circuits to:
apply, to one or more neural networks, sensor data representative of an intersection in a field of view of at least one sensor;
generate, based at least on the one or more neural networks processing the sensor data:
first data representative of one or more three-dimensional (3D) world-space locations corresponding to one or more line segments of the intersection; and
second data representative of directional information corresponding to the one or more line segments, the directional information indicating one or more directions of travel for navigating from the one or more line segments and through the intersection; and
based at least on the one or more 3D world-space locations and the directional information corresponding to the one or more line segments, perform one or more operations associated with control of a machine.

17. The processor of claim 16, wherein:
the one or more neural networks includes an encoder portion that processes the sensor data to compute a latent space vector; and
the one or more neural networks includes a decoder portion that processes the latent space vector to generate the first data representative of the one or more 3D world-space locations and the directional information corresponding to the one or more line segments of the intersection.

18. The processor of claim 17, wherein:
the at least one sensor includes a first sensor that generates a first subset of the sensor data and a second sensor that generates a second subset of the sensor data;
the encoder portion of the one or more neural networks includes a first encoder instance that processes the first subset of the sensor data to generate a first portion of the latent space vector and a second encoder instance that processes the second subset of the sensor data to generate a second portion of the latent space vector; and the latent space vector is generated based at least on concatenating the first portion and the second portion.

19. The processor of claim 16, wherein the one or more neural networks is trained based at least on converting predicted outputs of the one or more neural networks to 2D space, and comparing the predicted outputs in the 2D space to 2D ground truth data using a loss function.

20. The processor of claim 16, wherein the one or more neural networks is trained based at least on comparing 3D outputs of the one or more neural networks to one or more geometrical consistency constraints associated with intersections using a loss function.

21. The processor of claim 16, wherein the processor is comprised in at least one of:
   a control system for an autonomous or semi-autonomous machine;
   a perception system for an autonomous or semi-autonomous machine;
   a system for performing simulation operations;
   a system for performing deep learning operations;
   a system implemented using an edge device;
   a system implemented using a robot;
   a system incorporating one or more virtual machines (VMs);
   a system implemented at least partially in a data center; or
   a system implemented at least partially using cloud computing resources.

* * * * *